United States Patent [19]
Hatori et al.

[11] Patent Number: 5,977,974
[45] Date of Patent: Nov. 2, 1999

[54] INFORMATION PROCESSING APPARATUS AND METHOD

[75] Inventors: Kenji Hatori, Hatogaya; Hideo Takiguchi, Kawasaki, both of Japan

[73] Assignee: Canon Kabushiki Kaisha, Tokyo, Japan

[21] Appl. No.: 08/929,981

[22] Filed: Sep. 15, 1997

[30] Foreign Application Priority Data

Sep. 17, 1996 [JP] Japan .................................. 8-245097
Sep. 10, 1997 [JP] Japan .................................. 9-245646

[51] Int. Cl.$^6$ ................................................ G06F 17/30
[52] U.S. Cl. ........................ 345/349; 345/348; 345/334
[58] Field of Search .................................. 345/349, 334, 345/355, 356, 348; 381/41; 395/348, 349

[56] References Cited

U.S. PATENT DOCUMENTS

| | | | |
|---|---|---|---|
| 4,802,225 | 1/1989 | Patterson | 381/41 |
| 5,499,330 | 3/1996 | Lucas et al. | 395/145 |
| 5,621,874 | 4/1997 | Lucas et al. | 395/761 |
| 5,680,558 | 10/1997 | Hatanaka et al. | 395/334 |
| 5,731,997 | 3/1998 | Manson et al. | 345/348 |

*Primary Examiner*—Mark K. Zimmerman
*Assistant Examiner*—David E. Brown
*Attorney, Agent, or Firm*—Fitzpatrick, Cella, Harper & Scinto

[57] ABSTRACT

A plurality of data items are stored in a storage medium, and time information of each of the plurality of data items is obtained. In a display window on a display screen, a time axis, having a spiral shape, which includes arrangement positions, each corresponding to a predetermined period of time, is displayed. At each of the arrangement positions, on the time axis, corresponding to time represented by the obtained time information of each of the plurality of data items, information (data icon) representing the corresponding data item is displayed. The display sizes of the data icons are reduced toward the center of the spiral time axis, thereby depth can be expressed.

51 Claims, 27 Drawing Sheets

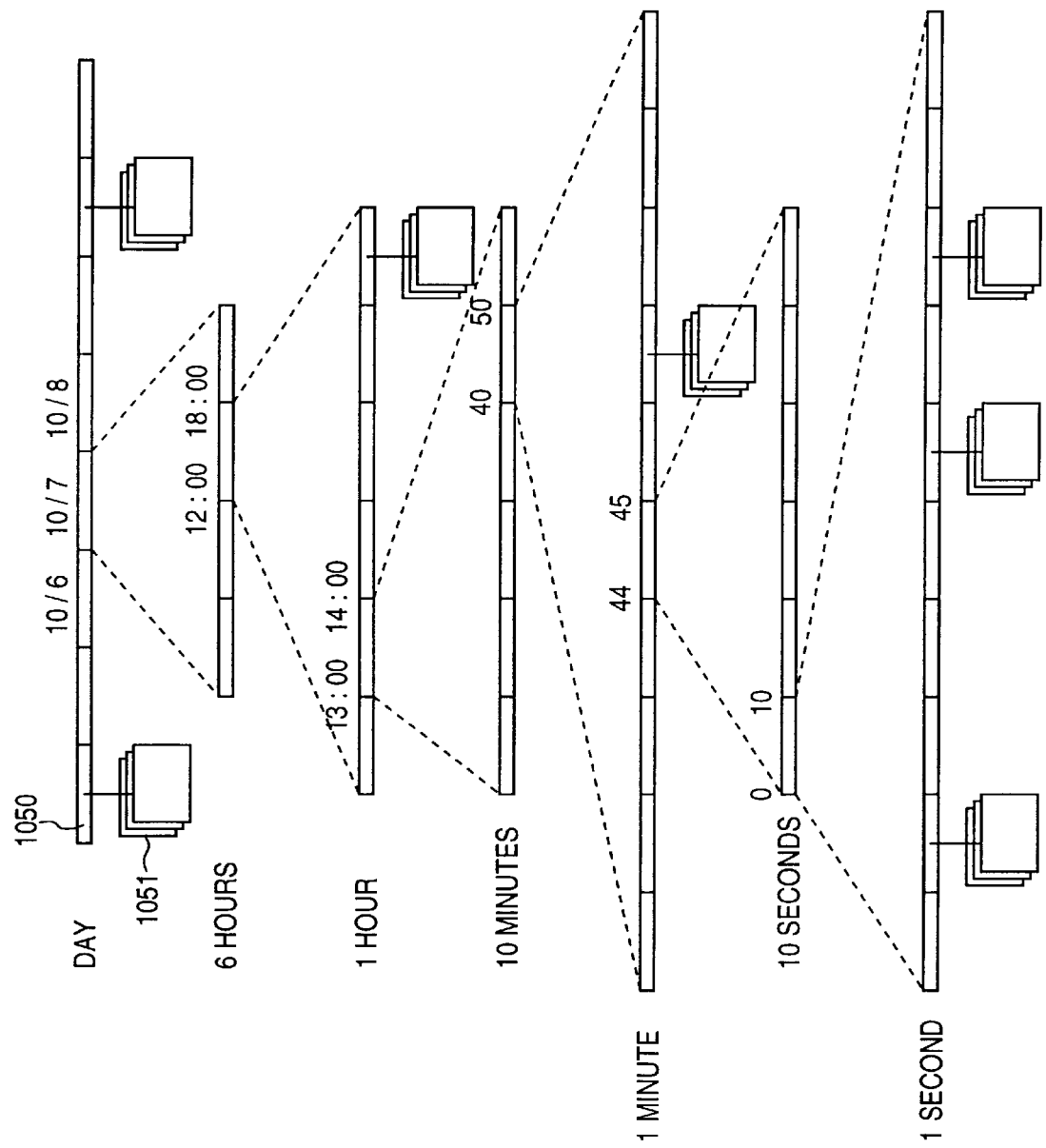

INFORMATION PROCESSING APPARATUS AND METHOD

BACKGROUND OF THE INVENTION

The present invention relates to an information processing apparatus and method and, more particularly, to an information processing apparatus and method which manage and display a plurality of data on the basis of parameters (e.g., date and time), related to the respective data, like database and a filing system.

In a file management system and a database system of a computer, for example, date and time is often used as an important parameter for managing a large number of data. In a file management system, date and time when a file is created, and date and time when the file is updated are automatically added to the file as its attribute.

Further, in a database system, a date and time filed is set in a field in a record, and the data may be managed on the basis of the date and time written in the date and time field. FIG. 25 is a view showing an example of data structure of a general personnel management database. In the personnel management database 30 shown in FIG. 25, date of birth is written in a date field 31 and respective personal data are managed on the basis of data in the date field 31. Further, in a schedule application software (called "scheduler", hereinafter), schedules are managed by date and time. For example, if an item on a schedule is a conference, by registering a document file to be used in the conference in the scheduler in relation to the item on the schedule, it is convenient to check which document file is used in the conference at a later time.

Further, when searching desired data from a large number of data, date-and-time data is a very important parameter. In the file management system, by displaying files in order of time on the basis of date and time of creation and/or correction of data, a user may be able to find a desired file by recalling his/her memory of when he/she created and updated the file. Further, in a database system, e.g., a personnel management system, searching and displaying data in order of date of birth is often performed. Furthermore, in the scheduler, it is possible to check each item on a schedule in order of time, in addition, it is also possible to find a desired data file registered in relation to an item on the schedule.

The most general unit of memory for a user would be date and time. The user often has a vague memory of date when a file is created or when the file is updated, although not a specific date. Therefore, if the user forgot a name of a desired file to be searched, by comparing the vague memory of creation and/or correction date of the desired file with the creation and/or correction dates of files, it is possible to find the desired file. The same thing can be said for using the scheduler, and a desired item may be found based on the vague memory of date and time. In the database system, data can be read in order of, e.g., date of birth by displaying the data in order of date of birth.

However, in the aforesaid file management system, whether creation and/or correction date and time of files which are displayed next to each other on a list are very close to each other or far apart from each other can not be known at a glance. Therefore, a user has to read creation and/or correction date and time of each of the files on the list, imagine time intervals between the date and time of the files to be either short or long, and compare the imagined time intervals with his/her memory to find a desired file. FIG. 26 is a view showing an example of displayed files by a general file management system.

In FIG. 26, reference numeral 40 denotes a file display window of the file management system, and files in a designated directory 41 are sorted and displayed in order of time. However, in order to grasp a sense that about when those files are created, for example, a user has to check date and time of the files displayed in a time/date area 42 one by one.

In displaying data by the database system, an interval between date of birth of given personal data and that of adjoining personal data sorted in order of date of birth may be one year, or may be ten years. Accordingly, independently of differences in interval between date and time of files, data sorted with respect to time are displayed one after another at the same intervals. Therefore, a user has to confirm the date of birth of each personal data by number, and imagine what is the interval between data of adjoining two data. In addition, it is even more troublesome for a user to obtain tendency of the personal data, such that there are many people belonging to a certain generation but there are a little people belonging to another generation. The user may be able to grab tendency of the personal data after performing troublesome and time-consuming work, such as grouping dates of birth by generation and displaying it, or making a graph of date of birth.

In order to overcome the aforesaid problems, a system capable of displaying data in such a manner that a user can intuitively have a sense of time is demanded.

SUMMARY OF THE INVENTION

The present invention has been made in consideration of the above situation, and has as its object to provide an information processing apparatus and method capable of displaying data in order of time on the basis of time stored in connection to the displayed data in such a manner that a user can easily have a sense of intervals between creation and/or correction time of the data.

It is another object of the present invention to provide an information processing apparatus and method capable of maintaining good display efficiency when displaying icons representing data in order of time on the basis of time store in connection to the data in such a manner that a user can easily have a sense of intervals between creation and/or correction time of the data.

It is still another object of the present invention to clearly display temporal order of data by arranging icons on a time axis expressed in a spiral form as well as display as many icons as possible. Further, it is still another object of the present invention to decrease the size of icons arranged on the spiral time axis as a display position of an icon approaches to the center of the spiral, thereby giving a sense of depth to a user so that the user can intuitively have a sense of temporal order.

Furthermore, it is still another object of the present invention to make it easy to change a range of time expressed by a time axis, and increase an operability for searching data by using icons.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 is a view showing a structure of data management according to the third embodiment;

DETAILED DESCRIPTION OF THE PREFERRED EMBODIMENTS

Preferred embodiments of the present invention will be described in detail in accordance with the accompanying drawings.

<First Embodiment>

Figure 1:
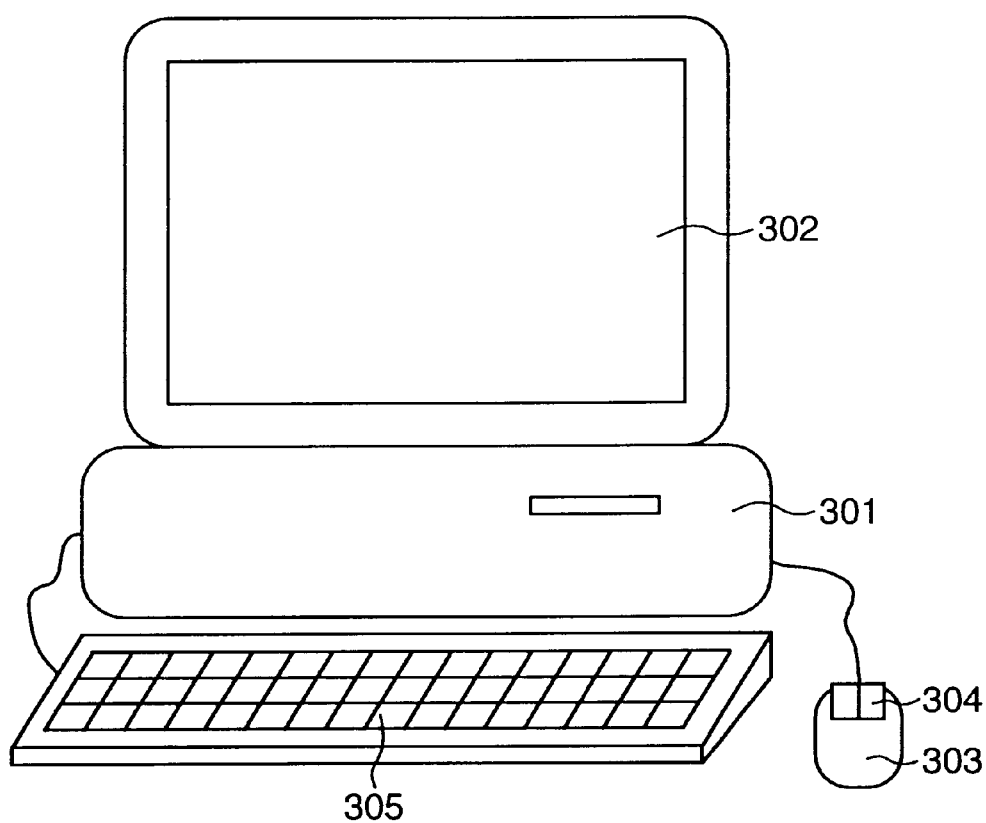
FIG. 1 is a front view showing an example of configuration of a personal computer which is a platform on which data management according to the first embodiment is performed.

FIG. 1 is a front view illustrating an example of configuration of a personal computer which is a platform on which data management according to the first embodiment is performed. In FIG. 1, reference numeral 301 denotes a main body of a computer system; 302, a display for displaying data; 303, a mouse as a pointing device; 304, a button of the mouse 303; and 305, a keyboard.

Figure 2:
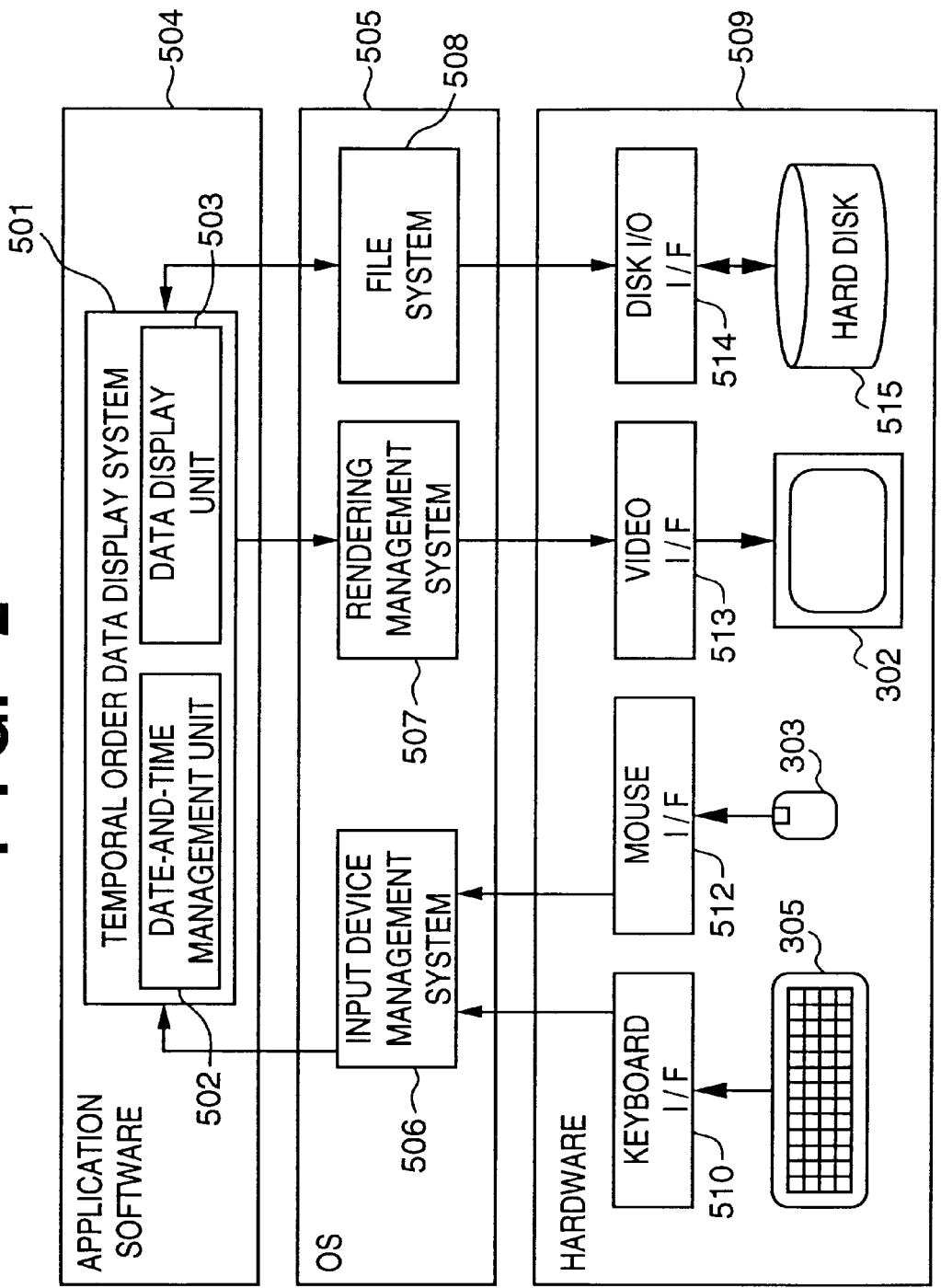
FIG. 2 is a block diagram illustrating a configuration of a hierarchical data management system including software and hardware.

FIG. 2 is a block diagram illustrating a configuration of a hierarchical data management system including software and hardware. In FIG. 2, reference numeral 509 denotes hardware layer which comprises various kinds of devices; 505, an operating system (OS) layer which operates on the hardware layer 509; and 504, application software executed on the OS layer 505. Note, units and elements which are naturally included in the hardware layer 509 and the OS layer 505 as configuration elements but not necessary for explaining embodiments of the present invention are not shown in FIG. 1. As examples of such not-shown units and elements, there are CPU and memory as hardware, and a memory management system as OS.

Reference numeral 515 denotes a hard disk which physically stores files and data; 508, a file system, configuring a part of the OS layer 505, which provides a function that the application software 504 can input/output a file to/from hardware without conscious of the hardware; and 514, a disk input/output (I/O) interface for the file system 508 to read and write from/to the harddisk 515. Note, the disk I/O interface (I/F) 514 may be configured so as to be connected to a floppy disk drive and/or to a CD-ROM drive.

Reference numeral 507 denotes a rendering management system, configuring a part of the OS layer 505, which provides a function that the application software 504 can render without conscious of hardware; and 513, a video interface (I/F) for the rendering management system 507 to render on the display 302.

Reference numeral 506 denotes an input device management system, configuring a part of the OS layer 505, which has a function for enabling the application software 504 to receive an input from a user without conscious of hardware; 510, a keyboard interface for the input device management system 506 to receive an input from the keyboard 305; 512, a mouse interface for the input device management system 506 to receive an input from the mouse 303; 501, a temporal order data display system (temporal order data browser); 502, a date-and-time management unit for managing data in order of date and time; and 503, a data display unit for displaying the data, managed in order of date and time, at intervals corresponding to time intervals in the managed order.

Figure 3:
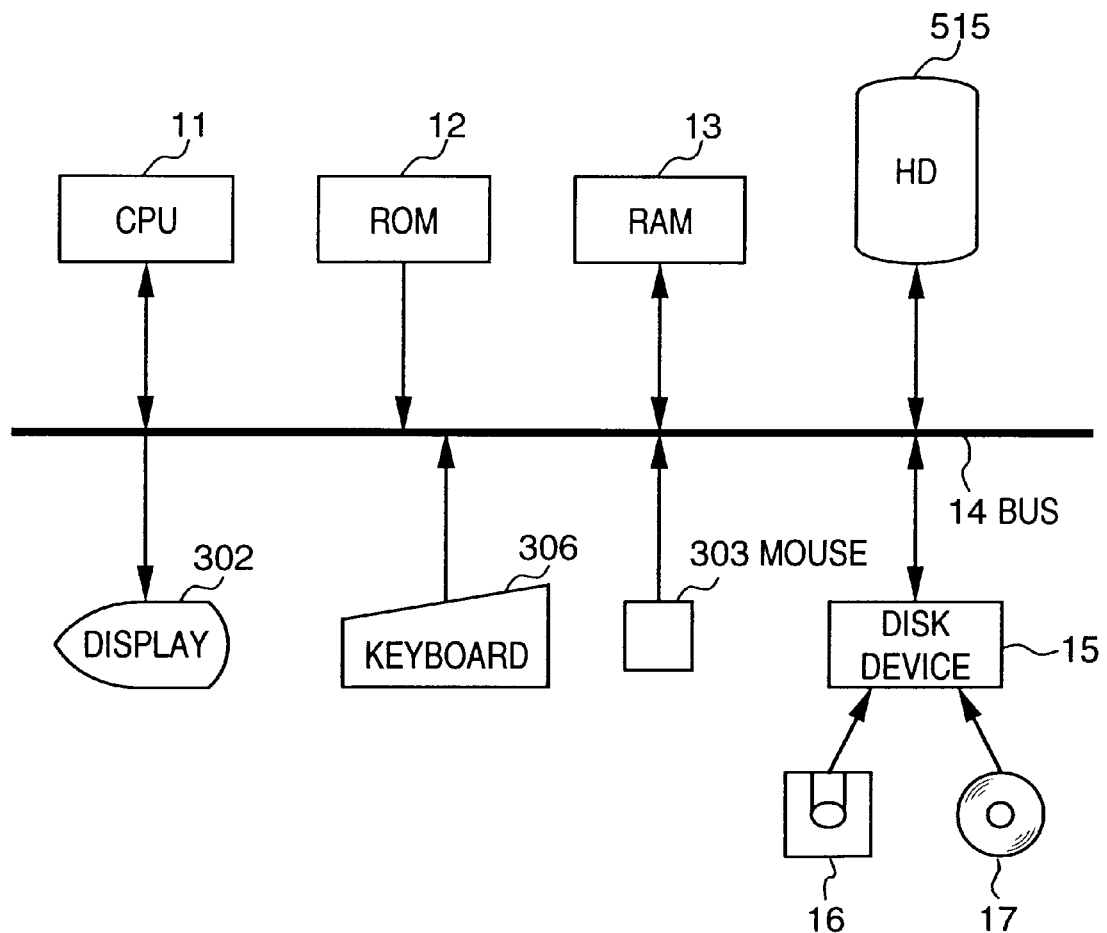
FIG. 3 is a block diagram illustrating a brief configuration of hardware of a computer system according to the first embodiment.

FIG. 3 is a block diagram illustrating a brief configuration of hardware of a computer system according to the first embodiment. In FIG. 3, reference numeral 11 denotes a CPU which performs a variety of controls by executing control programs stored in ROM 12 and RAM 13; 12, the ROM for storing programs to be executed by the CPU 11 when the computer system is booted, and various kinds of data; and 13, the RAM for storing down-loaded operating system and application program. Further, the RAM 13 provides a work area for the CPU 11 to performs a variety of controls. Further, reference numeral 14 denotes a bus to which the above units and each configuration of the hardware layer 509 are connected.

Furthermore, reference numeral 15 denotes a disk device for accessing to a floppy disk 16 or a CD-ROM 17. Accordingly, control programs can be read from a floppy disk or a CD-ROM storing the control programs which realize operations shown in flowcharts (will be explained later), and loaded onto the RAM 13.

Figure 4:
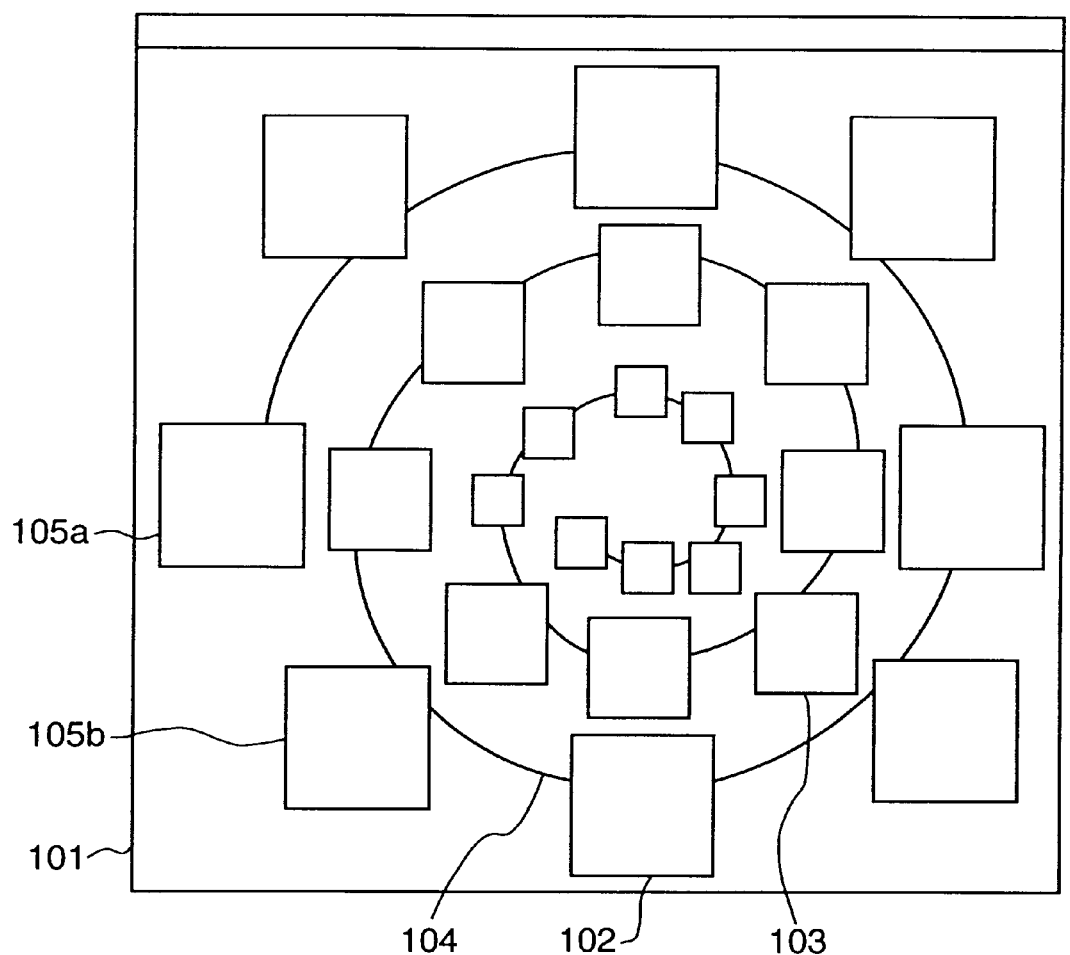
FIG. 4 is a view showing an example of an arrangement of displayed data icons according to the first embodiment.

FIG. 4 is a view showing an example of an arrangement of displayed data icons according to the first embodiment. In FIG. 4, reference numeral 101 denotes a display window displayed on the display 302; 102, 103, 105a and 105b, data icons representing image data; and 104, a part of time axis rendered with curve, and called "spiral", hereinafter. On the spiral 104, data icons representing data which are sensed or generated at an earlier time than time assigned to the end point of the outermost curve of the spiral are arranged from the outside toward the inside of the spiral in descending order of time.

In this example, in each cycle of 360 degrees of the spiral (in FIG. 4, the outermost cycle includes data icons 105a to 105b, for example. Each cycle is called "wind", hereinafter), maximum of eight data icons are arranged.

The time assigned to the end point of the outermost wind of the spiral 104 is changeable, and a user can designate it. For example, when a user wants to check data sensed or generated at later time than data whose data icons are currently displayed, by clicking the left button of the mouse 303, for example, the time assigned to the end point of the outermost wind of the spiral 104 is shifted to a later time. In this case, a data icon or icons representing data sensed or generated at later time appear in the outermost wind of the spiral 104, and a data icon or icons representing data sensed or generated at the earliest time displayed in the innermost wind of the spiral 104 stop being displayed. Other data icons respectively move toward the inside (i.e., to an earlier time) of the spiral 104. Whereas, if a user wants to check data sensed or generated at an earlier time than data whose data icons are currently displayed, by clicking the right button of the mouse 303, for example, the time assigned to the end point of the outermost wind of the spiral 104 is shifted to an earlier time. In this case, a data icon or icons representing data sensed or generated at an earlier time appear in the innermost wind of the spiral 104, and a data icon or icons representing data sensed or generated at the latest time displayed in the outermost wind of the spiral 104 stop being displayed. Further, other data icons respectively move toward the outside of the spiral 104.

Further, the sizes of data icons representing respective data differ depending upon their displayed positions, and gradually decrease from the outermost wind to the inner winds of the spiral 104.

Next, data structure, used in the first embodiment, for displaying data icons as described above is explained. In the following explanation, a case of managing image files is used as an example.

Figure 5:
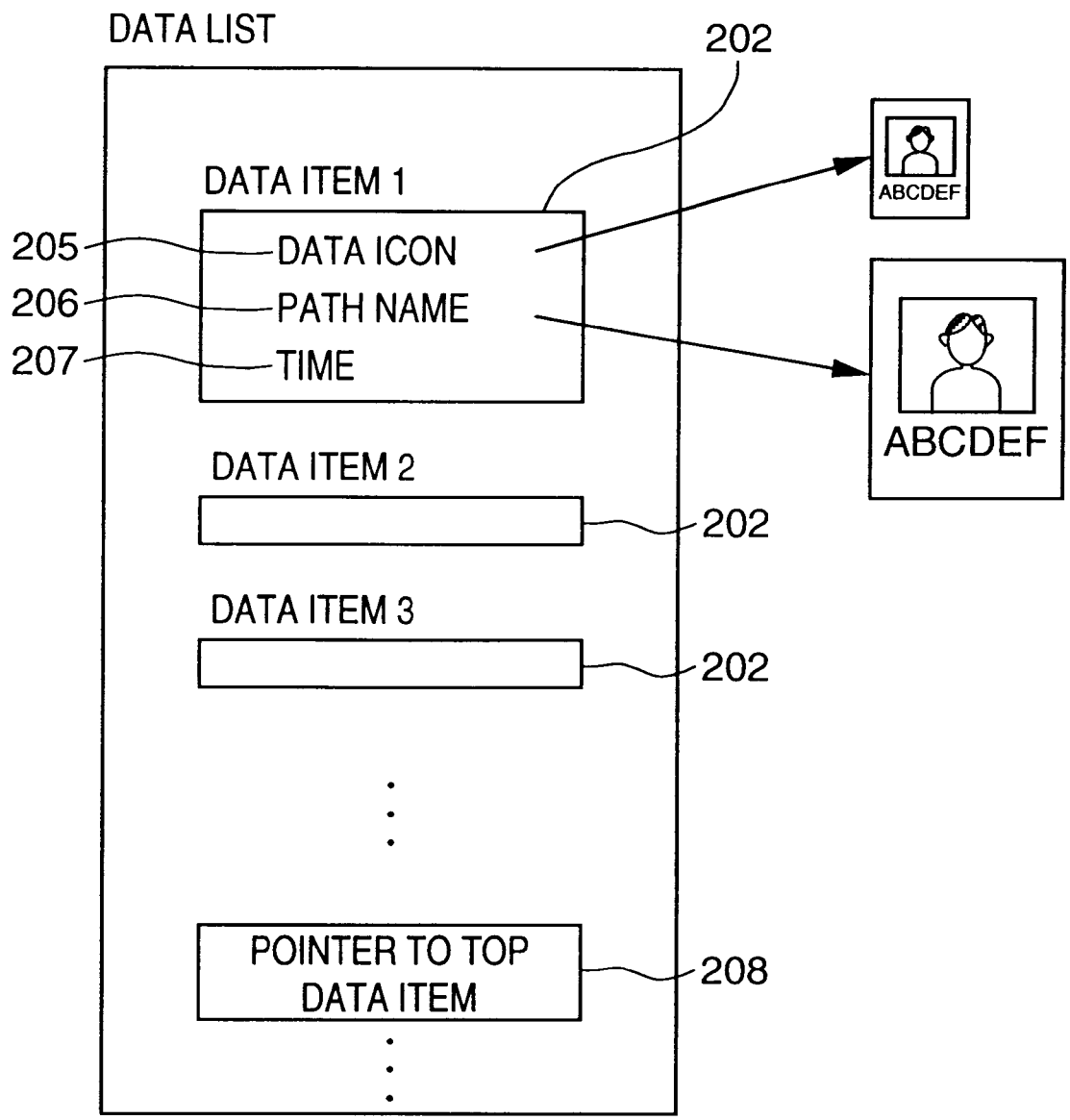
FIG. 5 is a conceptual view of data structure for managing data, such as images, to be displayed on a spiral.

FIG. 5 is a conceptual view of the data structure for managing image data to be shown on the spiral 104. In FIG. 5, reference numeral 202 denotes data items storing various attributes of data to be displayed in form of data icons. In each data item 202, a path name 206 of image data indicating where on the file system 508 the data is stored, a data icon 205 generated by compressing the image represented by the image data at a recognizable level, and time 207 showing when the image data is generated or when the image is sensed are stored. The data icon 205 is used for representing the image data on the spiral, and the path name 206 of the image data is used when displaying the original data itself.

A plurality of data items 202 can exist in a data list. In such case, they are listed in an order from a new data item to an old data item based on time 207 from the top of the list. As will be explained later, each data icon is displayed on the spiral 104 in accordance with the order of the data list.

Further, reference numeral 208 denotes a pointer to a top data item on the data list(data item 1 in this case), and placed at the end of the data list. When traversing data items from the top of the data list to the last data item on the data list, by referring to the pointer 208 which points to the top data item, it is possible to return to the data item 1. Accordingly, in a case where a data icon representing the oldest data item is shown in the middle of the spiral, data icons are displayed in temporal order from the newest data item (data item 1) behind the data icon representing the oldest data item, as will be explained later. As a result, it is possible to continuously display the data items on the spiral.

Figure 6:
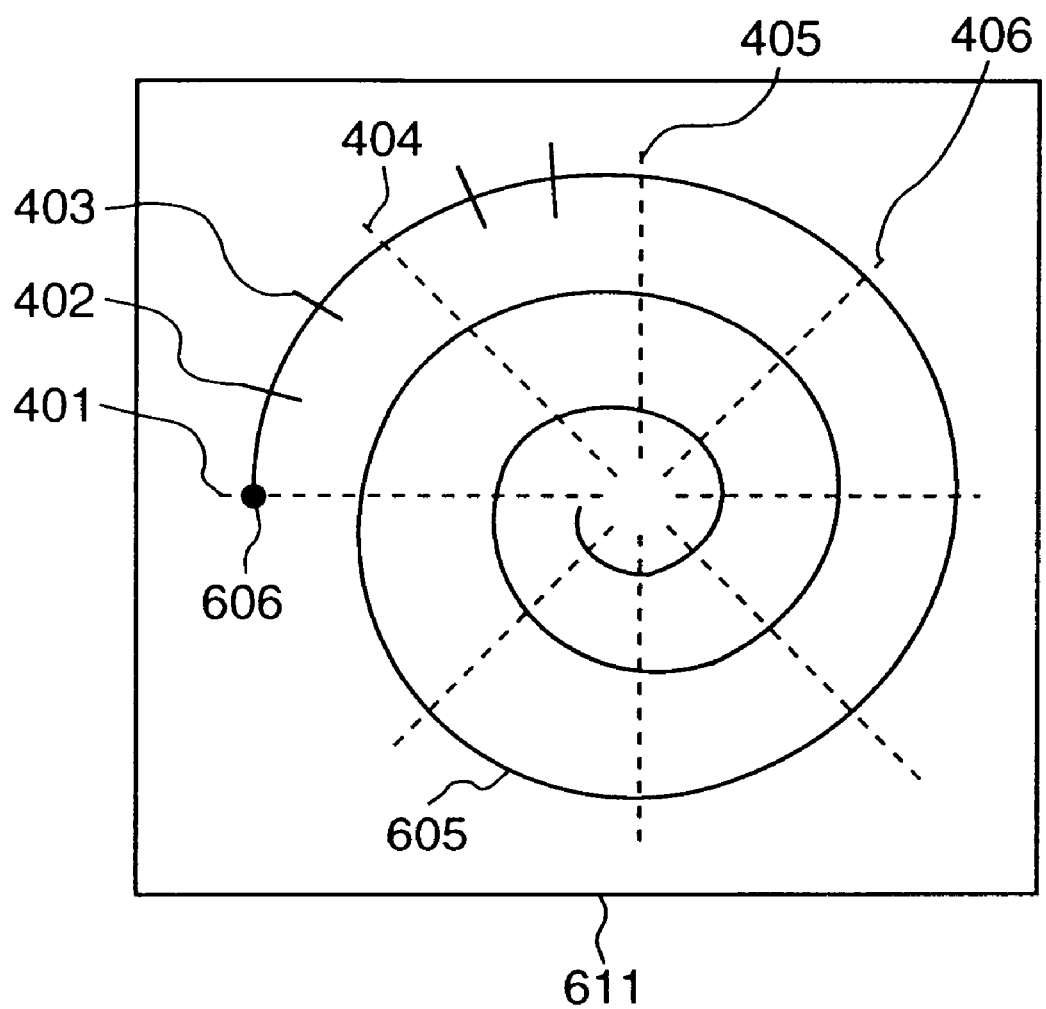
FIG. 6 is a view showing an example of data arrangement for managing display positions of data icons on the spiral.
Figure 7:
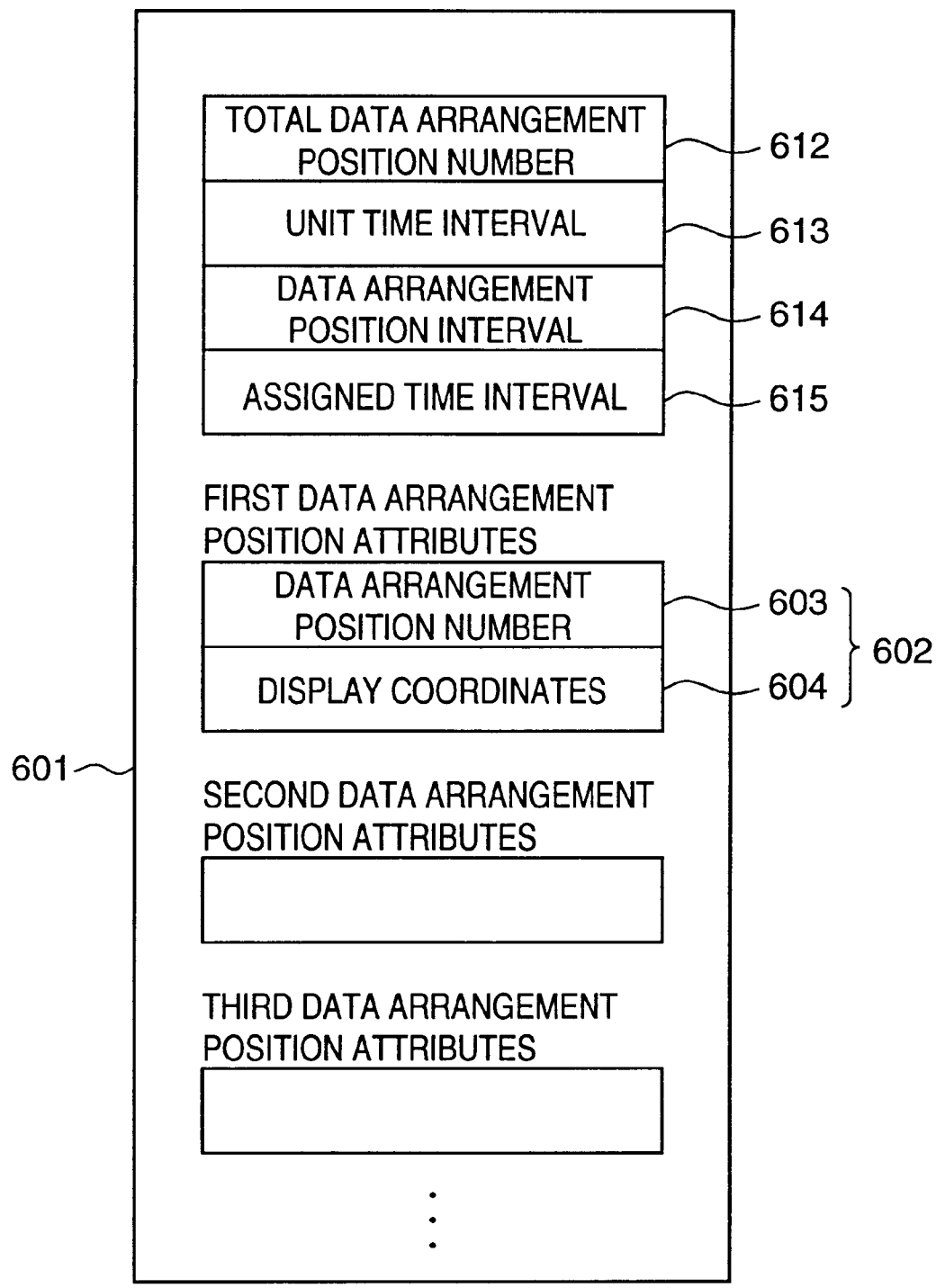
FIG. 7 is a view showing a data structure for managing display positions of data icons on the spiral.

FIG. 6 is a view showing an example of data arrangement for managing display positions of data icons on the spiral. Further, FIG. 7 is a view showing a data structure for managing display positions of data icons on the spiral. In FIG. 6, reference numeral 611 denotes a display window; and 605, a spiral. The display window 611 and the spiral 605 are equivalent to the display window 101 and the spiral 104, respectively. Broken and solid lines 401 to 406 are for showing that the centers of data icons are at the intersection of the lines 401 to 406 and the spiral. The same for lines which are not referred by reference numerals. Possible positions where data icons are placed on the spiral 605 are called "data arrangement positions", hereinafter. In order to simplify the explanation, not all the data arrangement positions are shown on the inside winds of the line 405 on the spiral. Therefore, there are actually two data arrangement positions between the lines 405 and 406, for example.

In FIG. 7, reference numeral 601 denotes a data structure for managing data arrangement positions (data arrangement position list). In the data arrangement position list, reference numeral 612 denotes the total data arrangement position number showing the number of all the data arrangement positions which exist on the spiral 605. 72 is given as the total data arrangement position number in the first embodiment. In other words, there are 72 data arrangement positions on the spiral 605 starting from the data arrangement position 606 to the inner winds.

Unit time interval 613 shows time interval between adjacent data arrangement positions, and it is set to an hour in the first embodiment. Accordingly, by taking the spiral 605 as an example, data arrangement positions shown with the lines 401, 402 and 403 divide the time axis by an hour. Further, to shift data icons on the spiral toward inner wind by one data arrangement position is to shift time assigned to the end point of the outermost wind of the spiral an hour later.

Data arrangement position interval 614 shows all data arrangement positions assigned to date and time. More specifically, it shows at every what data arrangement positions data icons are to be displayed basically. The reason for skipping data arrangement positions is that, in order to display data icons at all the data arrangement positions, the size of each data icon has to be reduced, which makes it hard to identify each data icon. A process for assigning date and time to the data arrangement positions indicated by the data arrangement position interval 614 will be explained later in detail. The value of the data arrangement position interval 614 is set to three, in this embodiment.

Assigned period 615 shows period between data arrangement positions to which date and time are assigned. In the first embodiment, since date and time are assigned to every three data arrangement positions and time interval between two successive data arrangement positions is an hour, the assigned period 615 is three hours. Thus, the assigned period 615 is a product of the unit time interval 613 and the data arrangement position interval 614.

Reference numeral 602 denotes data arrangement position attributes which are stored for each data arrangement position. A data arrangement position number 603 shown in the data arrangement position attributes 602 is a serial number of all data arrangement positions on the list, and the numbers are assigned to the data arrangement positions from the number 1. A display coordinates 604 are for showing coordinates of each data arrangement position on the display window 611. The display coordinates 604 may be coordinates of the left-uppermost corner and right-lowermost corner of a rectangular area, where a data icon is displayed, at a data arrangement position. In this case, the display coordinates 604 determine a display position of a data icon as well as the size of the data icon. The displayed sizes of data icons decreases from the outermost wind of the spiral to inner winds. Accordingly, it is possible to give a sense of depth to a user.

These data arrangement position attributes 602 on the top of the data arrangement position list 601 toward the bottom of the list have one-to-one correspondence to the data arrangement positions placed from the outermost wind of the spiral toward inner winds, respectively. In an example shown in FIGS. 6 and 7, the first data arrangement position attributes 602 at the top of the data arrangement position list 601 correspond to a data arrangement position on the line 401, the second data arrangement position attributes 602 correspond to a data arrangement position on the line 402, the third data arrangement position attributes 602 correspond to a data arrangement position on the line 403, and so on.

Next, an algorithm for displaying data icons according to the first embodiment is explained. First, an algorithm for displaying data icons in an initial state is explained. Briefly, for each data arrangement position, image data to be displayed at the data arrangement position is selected on the basis of time when the image data is generated or obtained, and displayed.

Figure 8:
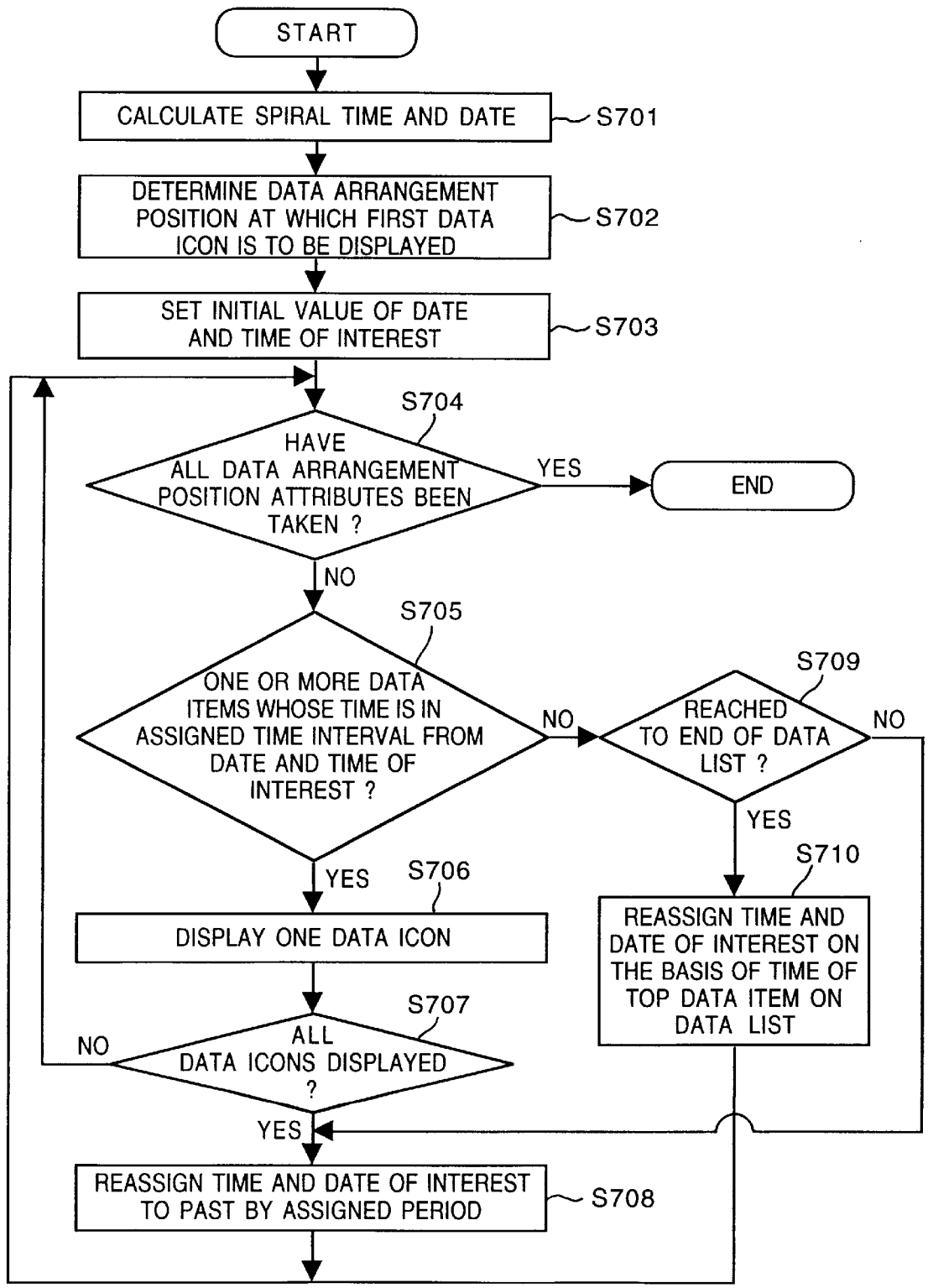
FIG. 8 is a flowchart for explaining a processing sequence for displaying data icons according to the first embodiment.
Figure 9:
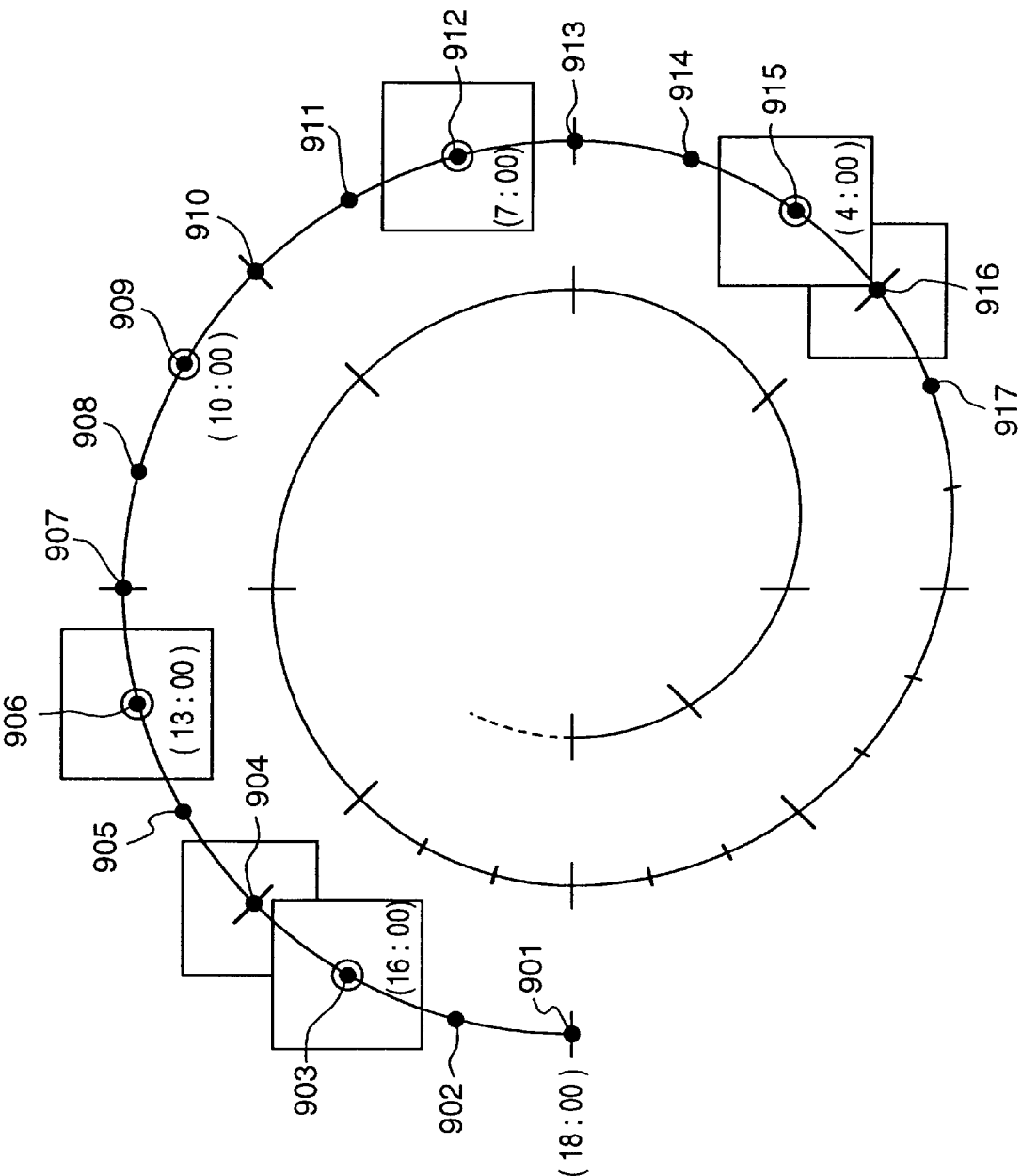
FIG. 9 is a view showing an example of an arrangement of displayed data icons according to the first embodiment.

FIG. 8 is a flowchart for explaining a processing sequence for displaying data icons according to the first embodiment. Note, a control program for realizing the processing sequence shown in FIG. 8 is stored in a floppy disk or a CD-ROM (not shown), for example, loaded down to the RAM 13, and executed by the CPU 11. Further, FIG. 9 is a view showing an example of an arrangement of displayed data icons according to the first embodiment. The processing sequence shown in the flowchart in FIG. 8 is explained with reference to FIGS. 5 and 9.

First in step S701, current date and time or date and time designated by a user is obtained, then "spiral date and time" is calculated. The "spiral date and time" is date and time assigned to the end point of the outermost wind of the spiral, in other words, the data arrangement position 901 on the outermost wind. The spiral date and time is calculated by rounding off the current date and time or the date and time designated by the user to the unit time interval 613. As described above, since the unit time interval 613 is one hour in the first embodiment, if the current date and time is "Jan. 1, 1990, 18:25", for example, then the minutes are rounded off, thus the spiral date and time is "Jan. 1, 1990, 18:00".

It should be noted that, if the spiral date and time is not in between time of the top data item (i.e., newest data item) on a data list and time of last data item (i.e., oldest data item) on the data list (refer to FIG. 5), namely, when date and time outside of a period in which data exists is obtained, the time obtained by rounding up the time of the top data item on the data list to the unit time interval 613, e.g., an hour, is set to the spiral date and time. With the aforesaid process, the spiral date and time is within a period in which data exists.

Next in step S702, a data arrangement position at which the first data icon is to be displayed is determined. This processing is performed in the following procedure. First, among data items 202 whose time 207 is earlier than the spiral date and time in the data list, the newest data item is searched, and the time of the newest data item is rounded off to the unit time interval 613. For example, with the spiral date and time of Jan. 1, 1990, 18:00, as described above, if time 207 of the newest data item among data items whose time is earlier than the spiral date and time is Jan. 1, 1990, 16:40, then Jan. 1, 1990, 16:00 is obtained.

Then, in the case shown in FIG. 9, the data arrangement position corresponding to the time 16:00 is a position 903. More specifically, a second data arrangement position, from the end point of the outermost wind of the spiral, indicative of Jan. 1, 1990, 16:00 is a position where a first data icon is to be displayed. Further, since the assigned period 615 is three hours in the first embodiment, date and time is assigned to every three data arrangement positions from the data arrangement position 903, namely, positions 906, 909, 912, 915, and so on.

Next in step S703, date and time corresponding to the data arrangement position obtained in step S702 is set as an initial value of date and time of interest. In the aforesaid example, it is Jan. 1, 1990, 16:00.

Next in step S704, data arrangement position attributes corresponding to the date and time of interest is taken from the data arrangement position list 601. If the data arrangement position attributes of the data items in the data arrangement position list 601 have been already taken and no other attributes are left, then the processing for displaying data icons on the spiral is completed, and otherwise the process proceeds to step S705. For the first time passing step S704, data arrangement position attributes of the data arrangement position (position 903) determined in step S702 are obtained. Thereafter, the data arrangement position attributes of data arrangement positions, separated from the data arrangement position whose attributes are obtained previously, at a predetermined interval (three, in the first embodiment) are obtained by performing a process in step S708 which will be explained later. Accordingly, every three data arrangement positions are selected out of 72 data arrangement positions in the first embodiment, and, if there is one data item in each assigned period, 24 data icons are displayed on the spiral.

In the next step S705, data (e.g., image data obtained by performing image sensing operation) generated between the date and time of interest and the time which goes back to the past from the date and time of interest by the assigned period 615, more specifically, a data item or items whose time 207 is in the above period is searched from the data list. For example, if the date and time of interest is Jan. 1, 1990, 16:00, then data item or items having time which is in between Jan. 1, 1990, 16:00 (closed end) and Jan. 1, 1990, 13:00 (open end) are searched. If one or more data items are found, then the process proceeds to step S706, whereas if no such data item is found, the process moves to step S709.

In step S706, a data item searched in step S705 (when a plurality of data items are found, one of them) is obtained, and a data icon of the data item is displayed at the position on the display window 101 on the basis of the display coordinates 604 of the data arrangement position attributes 602 obtained in step S704. Upon displaying the data icon, the size of the data icon 205 of the data item is obtained, and compared with the size of an area in which a data icon is to be displayed (obtained from the display coordinates 604). If the size of the area is larger than the size of the data icon, then the data icon is magnified, whereas, if smaller than the size of the data icon, then the data icon is reduced by performing, e.g., thinning.

In the next step S707, whether or not all the data icon or icons (of data item or items obtained in step S705) to be displayed are displayed is determined, and if they are, then the process proceeds to step S708. Whereas, if there is any data icon which is not shown, the process returns to step S704 and repeats processes of obtaining another data arrangement position attributes and displaying a data icon at the obtained data arrangement position. In a case where there are a plurality of data icons to be displayed in an interval corresponding to one assigned period, the next data arrangement position is obtained in step S704. For example, if there are two data items found in the assigned period which starts from the date and time of interest corresponding to the position 903 as shown in FIG. 9, then a data icon of one data item is displayed at the position 903, and a data icon of the other data item is displayed at the position 904.

In the aforesaid manner, however, if there are more than three data icons to be displayed in an interval corresponding to the assigned period which starts from the date and time of interest, the fourth or later data icons are to be displayed at the next data arrangement position to which a different date and time (three hours before, in this case) is assigned. For example, if there are four data icons to be displayed within an interval corresponding to the assigned interval which starts from the date and time of interest, i.e., 16:00, the fourth data icon is to be displayed at the position 906. Therefore, the unit time interval 613 is improper in such case, and the processing is completed by assuming that the data arrangement position attributes can not be obtained in step S704. Note, a message indicating that the unit time interval 613 is improper may be displayed to prompt a user to change the settings. When the user reads the message, he/she changes the unit time interval 613 from one hour to a half hour, for example, so that all the data can be displayed.

Furthermore, if it is determined that all the searched data icons are displayed, in step S707, then the process proceeds to step S708, and the date and time of interest is changed to an earlier time by the assigned period. For example, if the current date and time of interest is Jan. 1, 1990, 16:00, then the changed date and time of interest is Jan. 1, 1990, 13:00 which is three hours before Jan. 1, 1990, 16:00, and the processes from step S704 are repeated. Accordingly, data items having earlier time are searched and displayed. At this time, the data arrangement position corresponding to the new date and time of interest is the position 906, as will be seen from above.

In step S705, if there is no data satisfying conditions, the process moves to step S709. In step S709, whether the data list is searched to its end or not is determined. If it is, the process proceeds to step S710.

In step S710, by referring to the pointer 208, stored at the end of the data list, to the top data item, the time of the top data item in the list (i.e., the newest data item) is obtained. The obtained time of the top data item is rounded up to the unit time interval 613 (one hour, in the first embodiment) (calculated time). The aforesaid processes in steps S704 to S708 are performed by using the data and time obtained as above. Or, the same date and time which are assigned to the data arrangement positions previously may be used repeatedly. In this case, the date and time of interest is determined so that the initial date and time of interest (in this case, Jan. 1, 1990, 16:00) will be assigned to a data arrangement position and that the calculated time is included in the assigned period from the new date and time of interest.

For instance, the initial date and time of interest, namely, Jan. 1, 1990, 18:00 is forwarded by the assigned period 615 repeatedly, until the forwarded date and time of interest includes the calculated time. By determining the new date and time of interest in the aforesaid manner, data icons displayed at positions 903, 904, 906, 912, 915, and 916 in FIG. 9, for example, are displayed in exactly the same manner when they are displayed repeatedly. Further, if the assigned period is a factor of 24, the time to be assigned to data arrangement positions is fixed regardless of the date. More specifically, if the assigned period 615 is three hours, as described above, the time which is assigned to data arrangement positions is 16:00, 13:00, 10:00, . . . , 4:00, 1:00, 22:00, and 19:00, therefore, time part of the new date and time may be selected from the above. Hence, in a case where time of the top data item on the data list is Apr. 1, 1995, 19:25, then the date and time of interest is set to Apr. 1, 1995, 22:00. Accordingly, the data icon of the top data item on the data list is displayed whenever step S710 is executed later on. Thus, the data icon of a data item having the latest time in the data list is displayed behind a data icon of the data item having the earliest time. As a result, the data items are repeatedly shown on the spiral.

If the last data item (i.e., oldest data item) on the data list is not displayed, yet, in step S709, it means that there is no data item satisfying the conditions in step S705. More specifically, there is no data icon to be displayed in an interval corresponding to the assigned period which starts from the date and time of interest, therefore, without displaying any data icon at the data arrangement position obtained in step S704, the process proceeds to step S708 for obtaining a new date and time of interest and data arrangement position.

Figure 10:
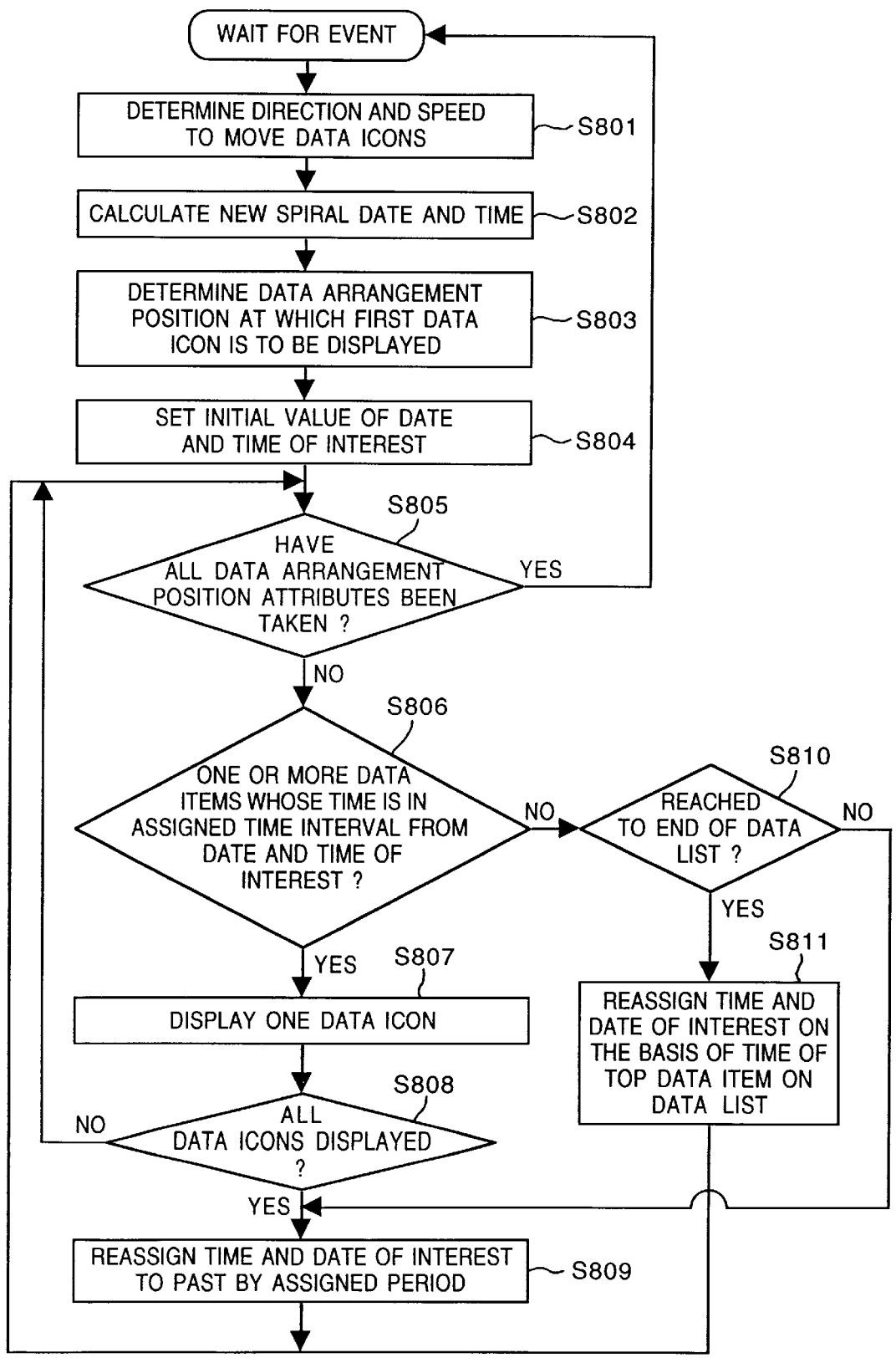
FIG. 10 is a flowchart showing a control sequence for moving display positions of data icons according to the first embodiment.

Next, an operation for moving data icons on the spiral will be explained. FIG. 10 is a flowchart showing a control sequence for moving display positions of data icons according to the first embodiment.

First, after a user clicks a button of the mouse 303 once, the direction and speed to move the data icons are determined in step S801. In the first embodiment, when the left button is clicked, data icons are moved to an earlier stage, namely, the data icons move to inner winds (i.e., toward the center) of the spiral. Whereas, if the right button is clicked, data icons are moved to a later stage, i.e., toward the outside of the spiral. The speed to move data icons is expressed by how many number of data arrangement positions the data icons are to be moved at a time. If the number is large, then the data icons are moved for a long distance at a time, which gives an impression to a user that the data icons are moving fast.

In the first embodiment, the amount of displacement of data icons is determined on the basis of which position on the display screen a cursor is displayed when the button of the mouse is clicked. The closer the position to the center of the display window 611 (FIG. 6, the center of the spiral 605), the larger the number of data arrangement positions (steps) by which data icons are moved. More specifically, let the distance between the cursor position and the center of the display window 611 be d, then the number of steps is obtained in accordance with the following equation.

Number of steps=8 −int((d/distance from the center to the edge of the display window))×8)

Accordingly, the data icon can be moved by maximum of eight steps at a time.

Next in step S802, the spiral date and time changed in response to the displacement of the data icons is calculated. For example, if the determined number of steps in step S801 is "three, toward outside", then it means that the time axis is shifted earlier by three hours, therefore, the spiral date and time is moved three hours earlier. In the case shown in FIG. 9, the new spiral date and time is 15:00.

However, when the spiral date and time becomes earlier than the time of the oldest data item in the data list, the time obtained by rounding up the time of the data item on the top of the data list is calculated, and the obtained date and time is set as the spiral date and time. In the subsequent processes, data items are sequentially shown from the top data item listed on the data list.

Whereas, when the spiral date and time becomes later than the time of the top data item (i.e., newest data item) on the data list, the time of the last data item (i.e., oldest data item) on the data list is rounded up to the unit time interval 613, and set as the spiral date and time. With the aforesaid processing, in the subsequent processes, the last data item on the data list is taken, and its icon is displayed at the data arrangement position in the outermost wind of the spiral. And behind the data icon of the last data item, data icons are sequentially displayed in an order from the older data item (the oldest data item) to a newer data item. According to the first embodiment as described above, it is possible to repeatedly display data icons so that the data icon of the newest data item and the data icon of the oldest data item are displayed continuously when shifting the data items.

In the subsequent steps S803 to S811, data icons are displayed while selecting data arrangement positions. The processes in steps S803 to S811 are the same as those in steps S702 to S710 in FIG. 8, therefore, the explanation of those is omitted. It should be noted that, if a data arrangement position is not obtained in step S805, the process moves to an event waiting state for waiting for the next instruction for moving the data icons (i.e., operation by button of the mouse 303).

According to the first embodiment as described above, data icons are arranged on a spiral in temporal order in consideration of time interval, and further it is possible to move the data items toward the outer winds (i.e., to a later time) and the toward inner winds (i.e., to an earlier time), thereby it is easier to search and manage the data with reference to a time axis.

Furthermore, after the last data item on the data list is displayed, the top data item on the data list is displayed again, therefore, the data items are repeatedly shown on the spiral. In addition, at least one data item is always displayed on the time axis.

Note, in the first embodiment, a case where data icons are arranged in an order from the newest data to the oldest data on a spiral from an outer wind toward an inner wind is explained, however, the data may be arranged from the oldest data to the newest data on the spiral from an outer wind toward an inner wind. A method of realizing to display data icons in the latter order is obvious from the first embodiment.

Further, data icons are displayed in the first embodiment, however, information indicating file names (e.g., character strings of file names) may be displayed instead. Furthermore, either displaying data icons or file names, the sizes of the displayed contents corresponding to respective files may be set uniform. In this case, a user can still obtain a sense of time interval from the space between the displayed positions of the contents on the spiral. Further, the time axis is expressed in the form of spiral in the first embodiment, however, the shape of the time axis is not limited to this. A variety of shapes, such as a shape meandering from the upper part of a display screen, may be used as the time axis. Furthermore, in the first embodiment, data icons are arranged on the basis of time stamps which are added to data files, however, the present invention is not limited to this. For example, data icons representing respective data records of a database may be arranged on the basis of time information (e.g., date of birth) included in a predetermined data field of the database.

Furthermore, in the first embodiment, in a case where a plurality of data items exist in a single assigned period starting from the date and time of interest, the second data icon is displayed at the data arrangement position 904 in FIG. 9, for example. By displaying the data icons in the above manner, limitation of the number of data icons to be displayed in a same assigned time period is removed. However, the present invention is not limited to this. For example, in step S704 or step S805, data arrangement positions may be always obtained at data arrangement position interval. By doing so, data icons in the same assigned period starting from the date and time of interest are displayed at the positions 903, 906 and 909, for example, in FIG. 9, and the limitation in the number of data icons is removed. In a case where data icons are displayed as above, when the time interval between data icons are long, there will be data arrangement position or positions at which no data icon is displayed. Therefore, a user is able to intuitively have a sense of time interval between respective data. Further, since the data icons are displayed at separated data arrangement positions which makes it easy to identify each data icon.

According to the first embodiment as described above, it is possible to display data icons in order of time which is related to data items of the data icons as well as to display the data icons so that a user is able to have a sense of time interval between the data items very easily.

<Second Embodiment>

In the first embodiment as described above, time interval between data items is expressed by vacant arrangement positions. However, in this method, if the time interval between data items is very long, efficiency for displaying data icons is not good. The following second embodiment is addressed to solve the above problem.

Note, a configuration of a personal computer system which is a platform where data management is executed, a configuration of a hierarchical data management system, including software and hardware, and a hardware configuration of the computer system are the same as those described in the first embodiment (FIGS. 1, 2, and 3), thus the explanation of those is omitted.

Figure 11:
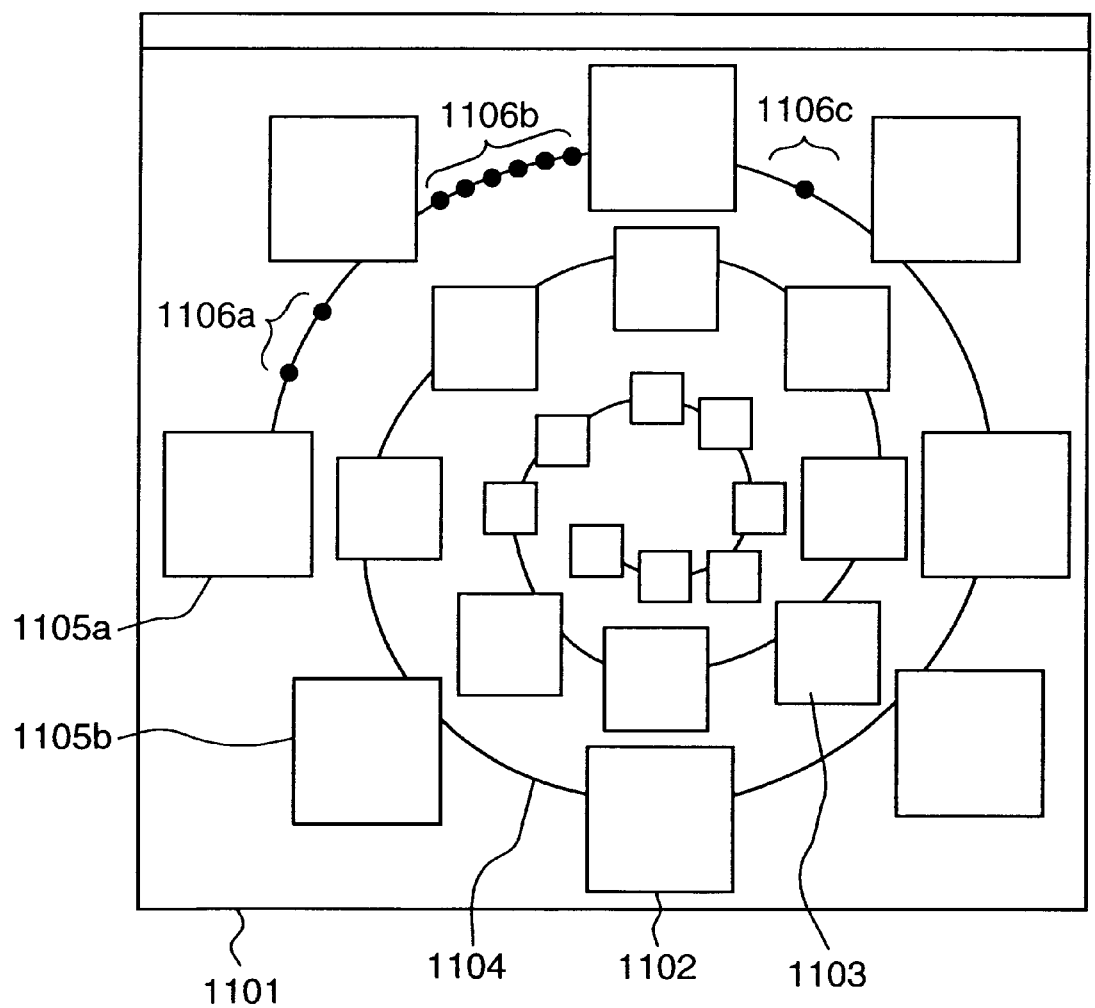
FIG. 11 is a view showing an example of an arrangement of displayed data icons according to a second embodiment.

FIG. 11 is a view showing an example of an arrangement of displayed data icons according to the second embodiment. In FIG. 11, reference numeral 1101 denotes a display window displayed on the display 302; 1102, 1103, 1105a and 1105b, data icons representing image data; and 1104, a part of a time axis rendered with curve, and it is called "spiral", hereinafter. On the spiral 1104, data sensed or generated at an earlier time than the time assigned to an end point of the outermost wind of the spiral 1104 are arranged from newer one to older one from the outermost wind toward the inner wind.

In this example, in each cycle of 360 degrees of the spiral (in FIG. 11, the outermost cycle includes data icons 1105a to 1105b, for example. Each cycle is a "wind"), maximum of eight data icons are arranged.

The time assigned to the end point of the outermost wind of the spiral 1104 is changeable, and a user can designate it. For example, when a user wants to check data sensed or generated at later time than data whose data icons are currently displayed, by clicking the left button of the mouse 303, for example, the time assigned to the end point of the outermost wind of the spiral 1104 is shifted to a later time. In this case, a data icon or icons representing data sensed or generated at later time appear in the outermost wind of the spiral 1104, and a data icon or icons representing data sensed or generated at the earliest time displayed in the innermost wind of the spiral 1104 stop being displayed.

Other data icons respectively move toward the inside (i.e., to an earlier time) of the spiral 1104. Whereas, if a user wants to check data sensed or generated at an earlier time than data whose data icons are currently displayed, by clicking the right button of the mouse 303, for example, the time assigned to the end point of the outermost wind of the spiral 1104 is shifted to an earlier time. In this case, a data icon or icons representing data sensed or generated at an earlier time appear in the innermost wind of the spiral 1104, and a data icon or icons representing data sensed or generated at the latest time displayed in the outermost wind of the spiral 1104 stop being displayed. Further, other data icons respectively move toward the outside of the spiral 1104.

Further, the sizes of data icons representing respective data differ depending upon their displayed positions, and gradually decrease from the outermost wind to the inner winds of the spiral 1104.

Furthermore, as shown in FIG. 11, if there is more than predetermined time interval between date and time when one data is generated and date and time when another data is generated, the time interval is expressed by markers as in the intervals 1106a, 1106b and 1106c. For example, if the predetermined time interval is three hours and if there is one marker as in the interval 1106c, then it means that the time interval between data corresponding to one data icon displayed at one end of the interval and data corresponding to the other data icon displayed at the other end of the interval is longer then three hours (but shorter than six hours). Further, when two markers are displayed as in the interval 1106a, then it means that time interval between data corresponding to one data icon displayed at one end of the interval and data corresponding to the other data icon displayed at the other end of the interval is longer than six hours (but shorter than nine hours).

If time interval between two data shown by adjacent two data icons is forty-eight hours, for example, then number of markers to be displayed is 48/3=16, thus, sixteen markers should be displayed between the two data icons. However, the space between data icons is limited, so if many markers are displayed in an interval between two data icons, then it would be hard to recognize each marker since markers would be displayed overlapped. In such case, any method may be used as far as it can express that time interval between one data and the next data is quite long.

Thus, in the example shown in FIG. 11, the maximum number of markers to be displayed between two data icons is 6, and if the time interval is longer than 18 hours (=6 markers×3 hours), then six markers are displayed for any time interval longer than 18 hours. This is shown as the interval 1106b. More specifically, the interval 1106b shows that time interval between data corresponding to one data icon displayed at one end of the interval 1106b and data corresponding to the other data icon displayed at the other end of the interval 1106b is longer than 18 hours.

In the aforesaid method, data icons are displayed in temporal order, and time interval between given two data is represented by the number of markers. Accordingly, a user can recognize newer data and older data as well as have a sense about how long the time intervals between those data at the same time. Further, if the lengths of time intervals are expressed by displayed intervals between data icons, there would be a considerable number of data arrangement positions at which no data icon is displayed. In the second embodiment, however, the lengths of time interval are expressed by using markers as described above, thus efficiency of displaying data icons is good.

Note, a data structure for managing data, such as images, to be displayed on the spiral 1104 as data icons and a data structure for managing positions at which data icons may be displayed on the spiral 1104 are the same as those described in the first embodiment (FIGS. 5 and 7), and explanation of those is omitted.

Next, an algorithm for displaying data icons according to the second embodiment is explained. First, an algorithm for displaying data icons in an initial state is explained. Briefly, for each data arrangement position, image data to be displayed at the data arrangement position is selected on the basis of time when the image data is generated or obtained, and displayed.

Figure 12:
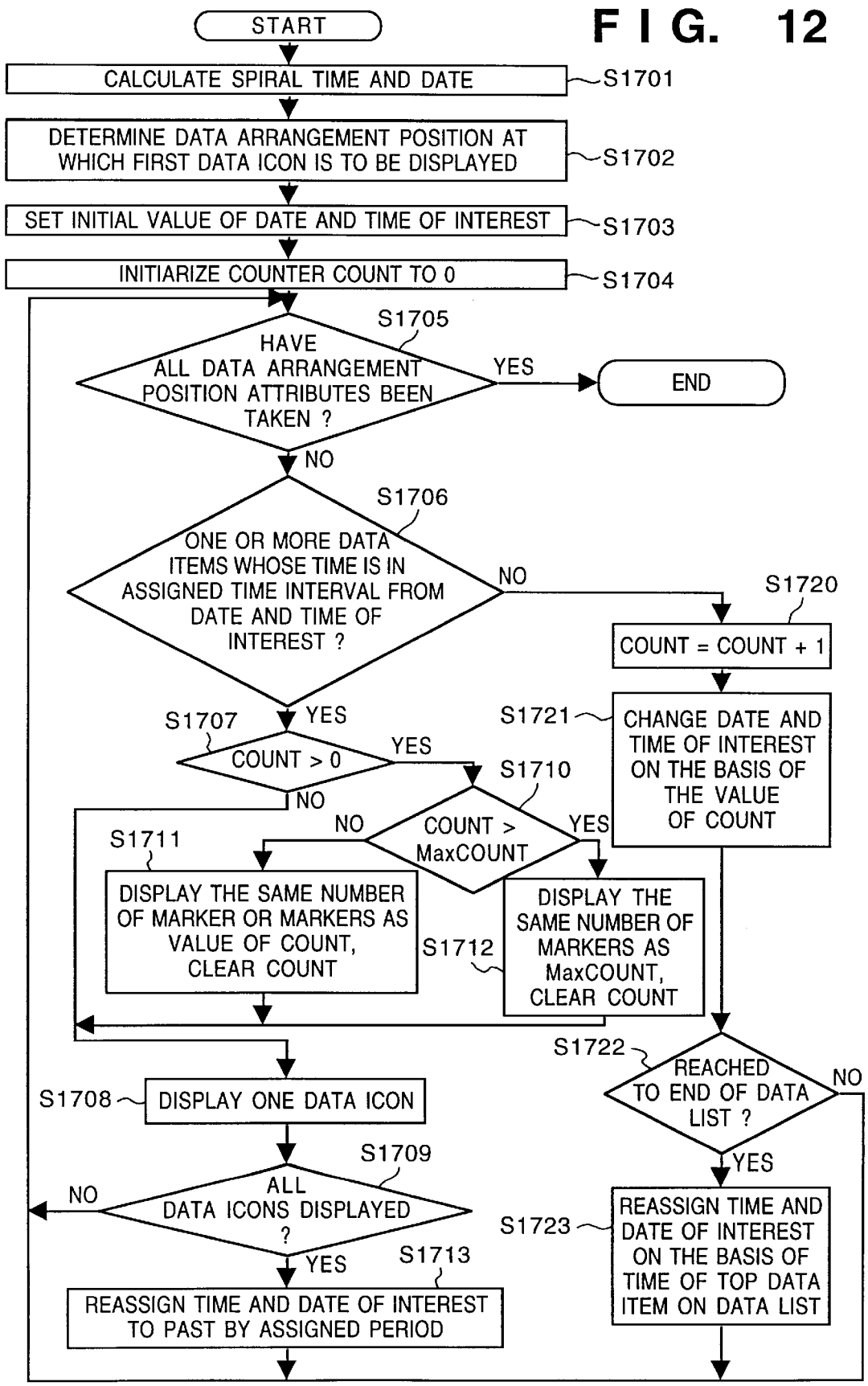
FIG. 12 is a flowchart for explaining a processing sequence for displaying data icons according to the second embodiment.

FIG. 12 is a flowchart for explaining a processing sequence for displaying data icons in the initial state according to the second embodiment. First in step S1701, current date and time or date and time designated by a user is obtained, then "spiral date and time" is calculated. The "spiral date and time" is date and time assigned to the end point of the outermost wind of the spiral. The spiral date and time is calculated by rounding off the current date and time or the date and time designated by the user to the unit time interval 613. As described above, since the unit time interval 613 is one hour in the second embodiment, if the current date and time is "Jan. 1, 1990, 13:25", for example, then the minutes are rounded off, thus the spiral date and time is "Jan. 1, 1990, 13:00".

It should be noted that, if the obtained spiral date and time is not in between time of the top data item (i.e., newest data item) on a data list and time of last data item (i.e., oldest data item) on the data list (refer to FIG. 5), namely, when date and time outside of a period in which data exists is obtained, the time obtained by rounding up the time of the top data item on the data list to the unit time interval 613 is set to the spiral date and time. With the aforesaid process, the spiral date and time is within a period in which data exists.

Next in step S1702, a data arrangement position at which the first data icon is to be displayed is determined. This processing is performed in the following procedure. First, among data items 202 whose time 207 is earlier than the spiral date and time in the data list (refer to FIG. 5), the newest data item is searched, and the time of the newest data item is rounded off to the unit time interval 613. For example, if the spiral date and time (time on line 401 in FIG. 6) is Jan. 1, 1990, 6:00, and time 207 of the newest data item among data items which are sensed or created prior to the spiral date and time is Jan. 1, 1990, 4:15, then the third data arrangement position (line 403 in FIG. 6) indicating Jan. 1, 1990, 4:00 is where the first data icon is displayed.

Next in step S1703, date and time of interest is set. The date and time of interest is date and time assigned to a selected data arrangement position. Initially, the data arrangement position determined in step S1702 is selected, therefore, date and time which is assigned to the data arrangement position selected in step S1702 is set as the date and time of interest. In the aforesaid example, it is Jan. 1, 1990, 4:00. Next in step S1704, a counter COUNT for counting period in which no data item exists is initialized to 0.

Next in step S1705, data arrangement position attributes of a data arrangement position at which no data icon is displayed is taken from the data arrangement position list 601. If the data arrangement position attributes of the data items in the data arrangement position list 601 have been already taken and no other attributes are left, then the processing is completed, and otherwise the process proceeds to step S1706. For the first time passing step S1705, data arrangement position attributes of the data arrangement position determined in step S1702 are obtained. Thereafter, the data arrangement position is determined on the basis of the data arrangement position whose attributes are obtained previously and the data arrangement position interval 614 when the value of the counter COUNT is 0. For example, three is set as the data arrangement position interval 614, data arrangement position attributes of the third data arrangement position from the one whose data arrangement position attributes are currently taken are obtained. Accordingly, every three data arrangement positions are selected out of 72 data arrangement positions in the second embodiment, and the maximum of 24 data icons can be displayed on the spiral. Note, if the value of the counter COUNT for counting period in which no data item exists is larger than 0 (in a case of returning from step S1722 or S1723 which will be explained later), it means that no data icon is displayed at the current data arrangement position. Accordingly, the data arrangement position attributes which are currently obtained are set again.

In the next step S1706, data generated between the date and time of interest and the time which goes back to the past from the date and time of interest by the assigned period 615, more specifically, a data item or items whose time 207 is in the above period is searched from the data list. For example, if the date and time of interest is Jan. 1, 1990, 18:00, then data item or items having time which is in between Jan. 1, 1990, 18:00 (closed end) and Jan. 1, 1990, 15:00 (open end) are searched. If one or more data items are found, then the process proceeds to step S1707, whereas if no such data item is found, the process moves to step S1720.

In step S1720, the value of the counter COUNT is incremented by one. Then in step S1721, the date and time of interest is changed in accordance with "(current date and time of interest)–(assigned period)×(the value of COUNT)". Next in step S1722, whether the data list is searched to its end as a result of changing the date and time of interest in step S1721 or not is determined. If not, the processes from step S1705 are repeated base on the new date and time of interest. For example, if the value of the COUNT is 1, then the new date and time of interest is 15:00. As a result, in step S1705, any data item whose time falls within a range between Jan. 1, 1990, 15:00 (closed end) and Jan. 1, 1990, 12:00 (open end) is searched.

If it is determined in step S1722 that the data list is searched to its end, then the process proceeds to step S1723 and the date and time of interest is set to the time of the top data item on the data list, and the process returns to step S1705. As described above, data items are searched in unit of three hours, and if there is no data item in each period of three hours, the value of the COUNT is incremented by 1, and the date and time of interest is changed. The COUNT becomes the number of the markers to be displayed later.

Note, in step S1723, by referring to the pointer 208 (FIG. 5), stored at the end of the data list, to the top data item, the time of the top data item in the list is obtained. The obtained time of the top data item is rounded to the next highest unit time interval 613 (one hour, in the first embodiment) (calculated time). The aforesaid processes in steps S704 to S708 are performed by using the data and time obtained as above. Or, the same date and time which are assigned to the data arrangement positions previously may be used repeatedly. In this case, the date and time of interest is determined so that the initial date and time of interest (in this case, Jan. 1, 1990, 18:00) will be assigned to a data arrangement position and that the calculated time is included in the assigned period from the new date and time of interest. For instance, the initial date and time of interest, namely, Jan. 1, 1990, 18:00 is forwarded by the assigned period 615 repeatedly, until the forwarded date and time of interest includes the calculated time. By determining the new date and time of interest in the aforesaid manner, data icons displayed at positions 1102, 1103, 1105*a*, 1105*b*, and so on, in FIG. 11, for example, are displayed in exactly the same manner when they are displayed repeatedly. Further, if the assigned period is a factor of 24, the time to be assigned to data arrangement positions is fixed regardless of the date. More specifically, if the assigned period 615 is three hours, as described above, the time which is assigned to data arrangement positions is 18:00, 15:00, 12:00, . . . , 6:00, 3:00, 24:00, and 21:00, therefore, time part of the new date and time may be selected from the above. Hence, in a case where time of the top data item on the data list is Apr. 1, 1995, 19:25, then the date and time of interest is set to Apr. 1, 1995, 21:00. Accordingly, the data icon of the top data item on the data list is displayed whenever step S1705 is executed later on. Thus, the data icon of a data item having the latest time in the data list is displayed behind a data icon of the data item having the earliest time. As a result, the data items are repeatedly shown on the spiral.

Whereas, if any data item is found in step S1706, then it is checked in step S1707 whether or not the value of the COUNT is larger than 0. If it is, then it means that there is a time interval between the time of the data item shown previously and the time of the data item obtained this time in step S1706 is larger than time interval of 3(hours)×(value of COUNT). Therefore, the process proceeds to step S1710 where processes for displaying a marker or markers start.

In step S1710, whether or not the value of the COUNT is larger than a predetermined value, MaxCOUNT (6, in an example shown in FIG. 11) is determined. If the value of the COUNT is less than the MaxCOUNT, then in step S1711, the same number of marker or markers as the value of the COUNT are displayed between the data icon displayed previously and the data icon to be displayed this time. Further, if the value of the COUNT is larger than the MaxCOUNT, then the same number of markers as the MaxCOUNT are displayed between the data icon displayed previously and the data icon to be displayed this time. Note, after displaying the marker or markers either in step S1711 or S1712, the value of the COUNT is reset to 0 to prepare for the next routine.

In step S1708, a data item searched in step S705 (when a plurality of data items are found, one of them) is obtained, and a data icon of the data item is displayed at the position on the display window 101 on the basis of the display coordinates 604 of the data arrangement position attributes 602 obtained in step S1705 upon displaying the data icon, the size of the data icon 205 of the data item is obtained, and compared with the size of an area in which a data icon is to be displayed. If the size of the area is larger than the size of the data icon, then the data icon is magnified, whereas, if smaller than the size of the data icon, then the data icon is reduced by performing, e.g., thinning.

In the step S1709, whether or not all the data icon or icons (of data item or items obtained in step S1706) to be displayed are displayed is determined, and if they are, then the process proceeds to step S1710. Whereas, if there is any data icon which is not displayed, the process returns to step S1705 and repeats processes of obtaining another data arrangement position attributes and displaying a data icon at the obtained data arrangement position. In a case where there are a plurality of data items to in one assigned period, each data icon is displayed separated from the data arrangement position where the previous data item is displayed by the data arrangement interval 614 (every three data arrangement positions in the second embodiment).

Whereas, if it is determined in step S1709 that all the data icons searched in step S1706 are displayed, then the process proceeds to step S1710, and the date and time of interest is changed to time earlier by the assigned period 615. For example, if the current date and time of interest is Jan. 1, 1990, 18:00, then the changed date and time of interest is Jan. 1, 1990, 15:00 which is three hours before Jan. 1, 1990, 18:00, and the processes from step S1705 are repeated. Accordingly, data items having earlier time are searched and displayed.

Figure 13:
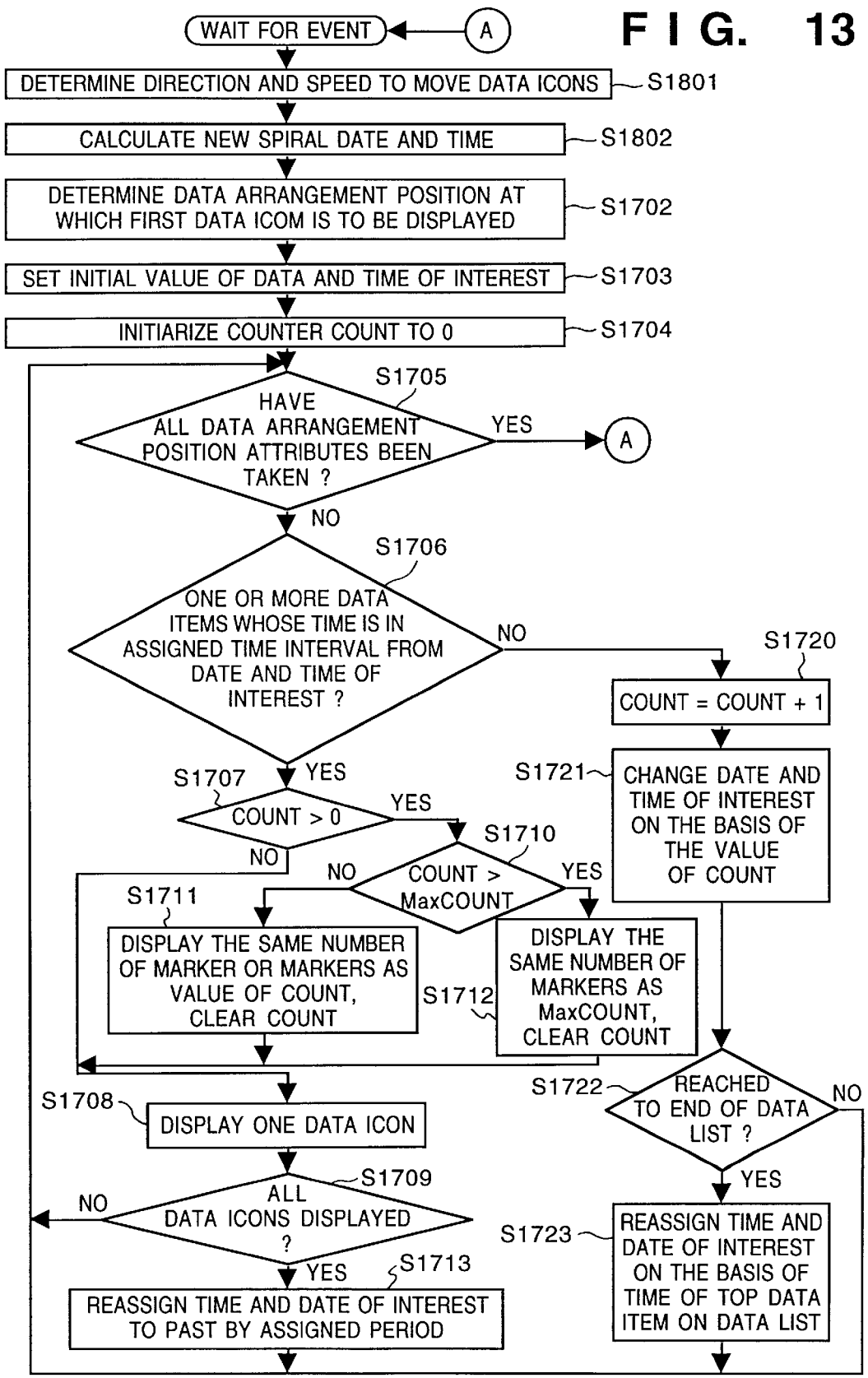
FIG. 13 is a flowchart showing a control sequence for moving display positions of data icons according to the second embodiment.

Next, an operation of moving data icons on the spiral will be explained. FIG. 13 is a flowchart showing a control sequence for moving display positions of data icons according to the second embodiment.

First, after a user clicks a button of the mouse 303 once, the direction and speed to move the data icons are determined in step S1801. In the second embodiment, when the left button is clicked, data icons are shifted in the past direction, thus the data icons move to inner winds of the spiral. Whereas, if the right button is clicked, data icons are shifted in the future direction, i.e., toward the outside of the spiral. The speed to move data icons is expressed by how many number of data arrangement positions the data icons are to be moved at a time. If the number is large, then the data icons are moved over a large date and time period, which gives an impression to a user that the data icons are moving fast.

In the second embodiment, the speed of displacement of data icons is determined on the basis of which position on the display screen a cursor is displayed when the button of the mouse is clicked. The closer the position to the center of the display window 1101 (FIG. 11, the center of the spiral 605), the larger the number of data arrangement positions (steps) by which data icons are moved. More specifically, let the distance between the cursor position and the center of the display window 611 be d, then the number of steps is obtained in accordance with the following equation.

Number of steps=8 $-int((d/$distance from the center to the edge of the display window$))\times 8)$ Accordingly, the data icon can be moved by maximum of eight steps at a time.

Next in step S1802, the spiral date and time changed in response to the displacement of the data icons is calculated. For example, if the determined number of steps in step S1801 is "three, toward outside", then it means that the time axis is shifted earlier by three hours, therefore, the spiral date and time is moved three hours earlier. For example, if the current spiral date and time is Jan. 1, 1990, 15:00, then the new spiral date and time is Jan. 1, 1990, 12:00.

However, when the spiral date and time becomes earlier than the time of the oldest data item in the data list, the time obtained by rounding up the time of the data item on the top of the data list is calculated, and the obtained date and time is set as the spiral date and time. Accordingly, in the subsequent processes, data items are sequentially shown from the top data item listed on the data list.

Whereas, when the spiral date and time becomes later than the time of the top data item (i.e., newest data item) on the data list, the time of the last data item (i.e., oldest data item) on the data list is rounded up to the unit time interval 613 is obtained, and set as the spiral date and time. With the aforesaid processing, in the subsequent processes, the last data item on the data list is taken, and its icon is displayed at the data arrangement position in the outermost wind of the spiral. And behind the data icon of the last data item, data icons are sequentially displayed in an order from an older data item on the data list to a newer data item. According to the second embodiment as described above, it is possible to repeatedly display data icons so that the data icon of the newest data item and the data icon of the oldest data item are displayed continuously when shifting the data items.

In the subsequent steps, data icons are displayed while selecting data arrangement positions. Those processes are the same as those in step S1702 and its subsequent steps, therefore, the explanation of those is omitted.

Note, in the second embodiment, a case where data icons are arranged from the newest data to the oldest data on a spiral from an outer wind toward an inner wind is explained, however, the data may be arranged from the oldest data to the newest data on the spiral from an outer wind toward an inner wind. A method of realizing the displaying of data icons in the latter order is obvious from the second embodiment.

According to the second embodiment as described above, data icons are arranged on a spiral in temporal order, and further it is possible to move the data items toward outer winds (i.e., to a later time) and toward inner winds (i.e., to an earlier time), thereby it is easier to search and manage the data with reference to a time axis.

Furthermore, according to the second embodiment, in a case where time interval between two subsequent data items is longer than a predetermined time, a marker or markers are displayed in dependence upon the time interval. More specifically, data icons are displayed on a spiral along with markers which clearly show time interval. Accordingly, a user is able to have a sense of time intervals between data icons displayed on the spiral. Further, since each time interval may be expressed by a marker or markers, when a time interval between subsequent data item is long, it is possible to efficiently display data icons on the spiral.

<Third Embodiment>

In the second embodiment, data icons are displayed on a spiral, and time interval between data time of data items are expressed by a maker or markers which are also displayed on the spiral. In the third embodiment, data icons are arranged on concentric ellipses. Note, the configuration of an apparatus according to the third embodiment is the same as the one described in the first embodiment, thus the explanation of it is omitted. Further, it would be apparent that various kinds of closed figures, such as rectangles, may be used instead of ellipses.

Figure 14:
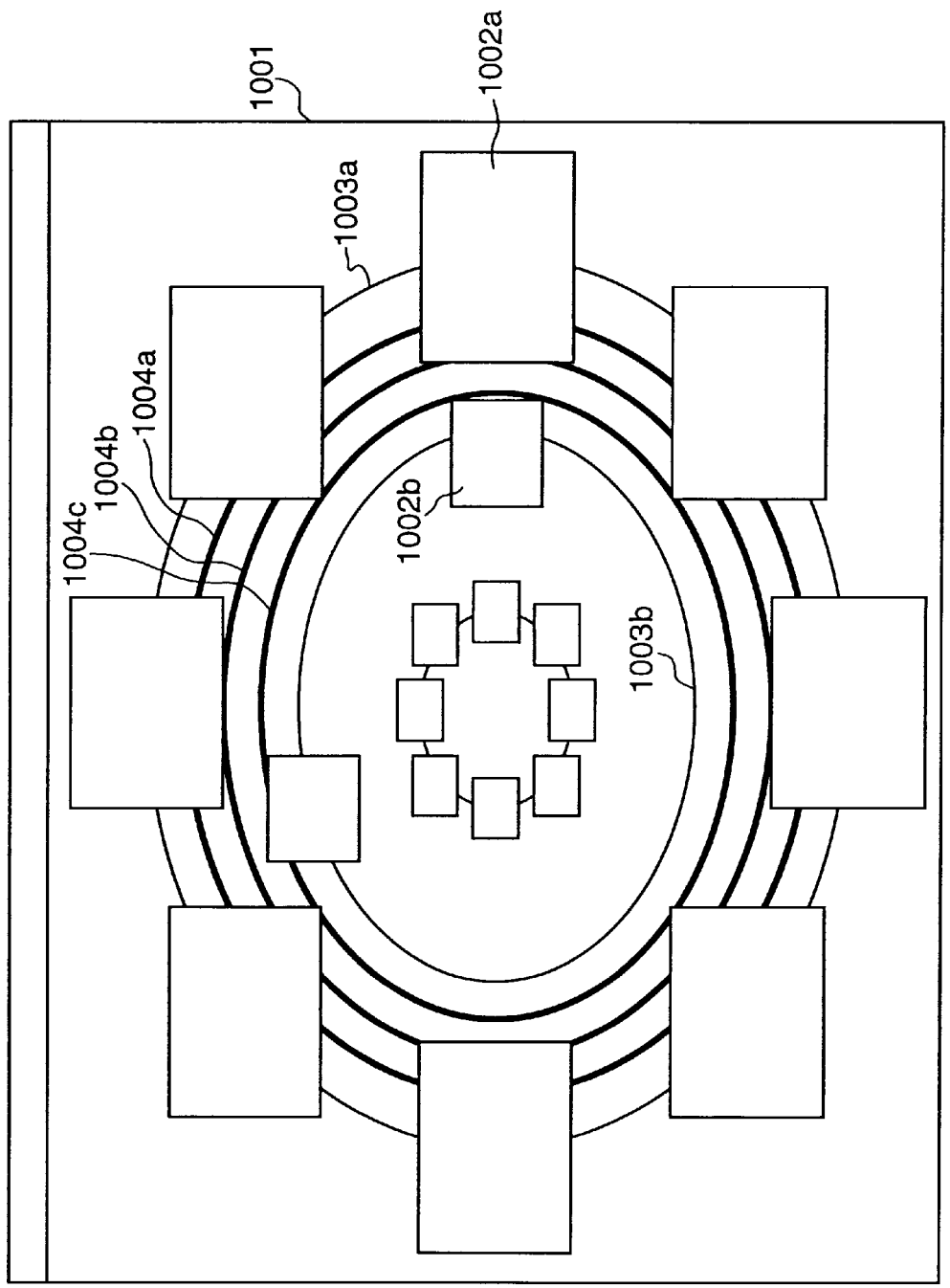
FIG. 14 is a view showing an example of an arrangement of displayed data icons according to a first embodiment.
Figure 15A:
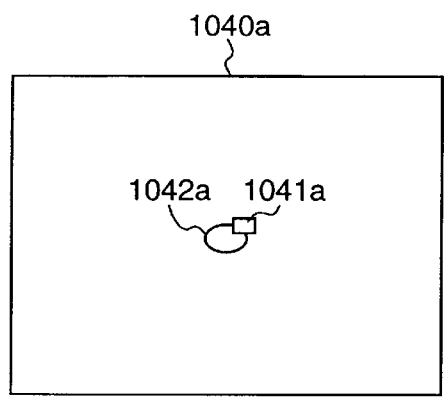
FIGS. 15A to 15D show examples of zoomed-in images and zoomed-out images of a ring and a data icon displayed on the ring.
Figure 15B:
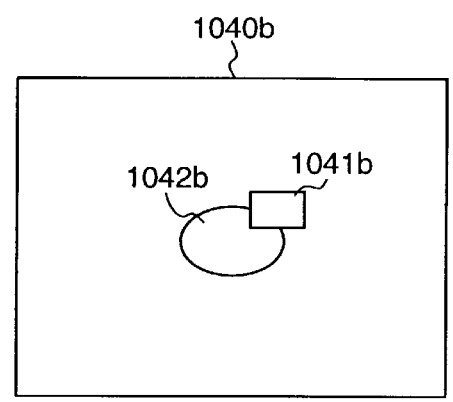
Figure 15D:
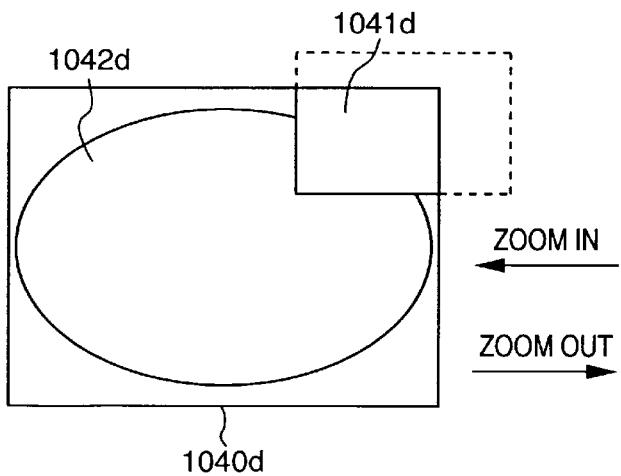
Figure 15C:
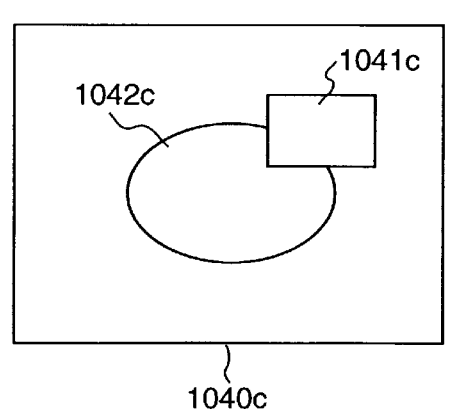

FIG. 14 is a view showing an example of an arrangement of displayed data icons according to the third embodiment. In FIG. 14, reference numeral 1001 denotes a display screen, and rectangles, 1002a, 1002b, and so on, are data icons. Reference numerals 1003a and 1003b denote rings representing dates to which the data icons on the rings a re related. On the rings, the data icons of data items related to dates which are assigned to the rings are displayed. Each ring represents a day, and the dates represented by the rings go back to an earlier time or to a later time toward the center of the display screen 1001. Further, data icons on the outer rings are displayed in sizes larger then those of data icons displayed on the inner rings. Accordingly, depth is expressed as if the periphery of the display screen is in the near side and the center of the display screen is in the far side.

When a user wants to display data icons displayed on the inner rings in a larger size, zooming-in operation is performed. Thereby, the data icons are displayed larger. For example, the size of the data icon 1002b increases continuously along with the ring 1003b. The ring 1003a and the data icon 1002a on the ring 1003a will be forced out from the display screen 1001. When zooming-out operation is performed, the sizes of rings and data icons which are currently displayed decrease so that the rings and the data icons converge on the center, and new data icons and rings of later time or earlier time start appearing as if they enter the display screen from outside.

In the file management system, by selecting directly and designating to switch the display status to display data icons in temporal order according to the third embodiment, a ring representing a date at that point is displayed as the outermost ring (or as the innermost ring). Note, in default, since the far side expresses the past and the near side expresses later time, the ring representing the date at that point is the outermost one. Further, the direction of time can be arbitrary switched by a user.

When a data icon representing a desired data item is found from data icons currently displayed, by double-clicking a mouse on the data icon on the display screen, a corresponding data file is opened in another window. Accordingly, the user is able to check the content of the file and edit it.

Further, if a time interval between the date represented by the ring 1003a and the date represented by the adjacent ring 1003b on which the next data icon is displayed is longer than a day, then supplemental rings 1004a, 1003b and 1004c are inserted. Here, each supplemental ring represents a day, and, since there are three supplemental rings 1004a, 1003b and 1004c between the rings 1003a and 1003b, the rings 1003a and 1003b are separated by three days. If the time interval between the rings 1003a and 1003b is longer than predetermined days, e.g., seven days, the number of supplemental rings is fixed to seven. This is because, when the interval is longer than the predetermined days, it is enough to express that "the dates represented by two rings are separated at by quite a long time interval" with seven supplemental rings, and because it would be hard to distinguish each supplemental ring if more than the predetermined number of rings are displayed.

As described above, by inserting and displaying a supplemental ring or rings in a time interval when no data exists for more than a predetermined period, an effect of compressing the time interval is obtained. As a result, while expressing a time interval between data icons, the data icons are always displayed efficiently on the display screen.

FIGS. 15A to 15D show examples of zoomed-in images and zoomed-out images of a ring and a data icon displayed on the ring. In FIGS. 15A to 15D, it is assumed that the center of the display screen shows earlier time, and the periphery of the display screen shows later time. In FIGS. 15A to 15D, reference numerals 1049a to 1040d denote display screens; 1042a to 1042d, rings to which the same date is assigned; and 1041a to 1041d, data icons on the respective rings 1042a to 1042d (i.e., data icons of data item belonging to the period represented by the rings). As shown in FIGS. 15A to 15D, when zooming in the displayed contents (i.e., when continuously checking data to an earlier time), the data icon 1041a and the ring 1042a which first appear in the central part of the display screen 1049a are small in size, and, as continuing zooming-in the displayed contents, the data icon 1041a and the ring 1042a are magnified to the size as shown by the data icon 1041b and the ring 1042b, for example, then to the size as shown by the data icon 1041c and the ring 1042c, and even further to the size as shown by the data icon 1041d and the ring 1042d. The data icon 1041d is displayed in a large size, thus, only a part of the data icon is displayed on the display screen 1040d. By further zooming-in the displayed contents, the data icon 1041d will disappear from the display screen. When performing zooming-out operation, the size of the data icon and the ring decreases in the reverse manner.

Further, in the display screen 1049a, outside of the ring 1042a, there actually is a ring, larger than the ring 1042a, which represents a period in later time, further, outside of these rings, there is another ring, larger than the above rings, which represents a period in later time, and so on. In the display screen 1040d, inside of the ring 1042d, there actually is a ring, smaller than the ring 1042d, which represents a period in earlier time, further, inside of these rings, there is another ring, smaller than the above rings, which represents a period in earlier time, and so on. Thus, as an overall image, the one as shown in FIG. 14 is actually displayed.

As described above, by arranging data icons on respective rings on the basis of the date and time of the data icons, and moving them by performing zooming-in or zooming-out operation, it is possible to display data icons in a manner conforming to memory of a user. Further, it is possible for a user to intuitively grab a distribution of data on the time axis.

Each of the rings represents a predetermined period, and if there are a number of data items in the predetermined time period, data icons corresponding to the data items may not be able to displayed using only one ring. In this case, the period represented by a ring is changed so as to overcome the above problem in the third embodiment.

FIG. 16 is a view showing a structure of data management according to the third embodiment. Reference numeral 1050 denotes a period, corresponding to each ring, partitioned off a predetermined time interval. The period 1050 is a day in the third embodiment, and each period is called "cell". Data items 1051 having data time within the cell 1050 belong to the cell 1050, for instance. For showing the data items, rings are rendered by the unit of cell by traversing the cells, and data icons corresponding to the data items which belong to each cell are rendered on each ring. Then, in response to the zooming-in or zooming-out operation, the cells are traversed, in a conceptual cell order shown in FIG. 16, in the right direction or in the left direction, then the data icons are displayed.

At this time, if many data items belong to a given cell, or more precisely, belong to a period represented by the cell, it is preferred to display data icons of these data items slowly so that all the data icons can be checked well. Accordingly, cells to which more than a predetermined number of data items belong are divided into cells each of which represents a shorter period. In an example shown in FIG. 16, since there are many data items which belong to a cell representing October, 7 (a cell representing a day is called "day cell", hereinafter), this cell is divided into four cells each of which represents six hours (called "six-hour cell", hereinafter). Among the four six-hour cells, if there are many data items which belong to the cell representing a period between 12:00 to 18:00, then that cell is divided into cells each representing an hour (called "hour cell", hereinafter). In a similar manner, a cell is divided into cells each of which represents ten minutes (called "ten-minute cell", hereinafter), and into cells each of which represents a minute (called "minute cell", hereinafter), even further into cells each of which represents ten seconds (called "ten-second cell", hereinafter), and so on, until the number of data items which belong to one cell becomes equal or smaller than a predetermined value.

Figure 17:
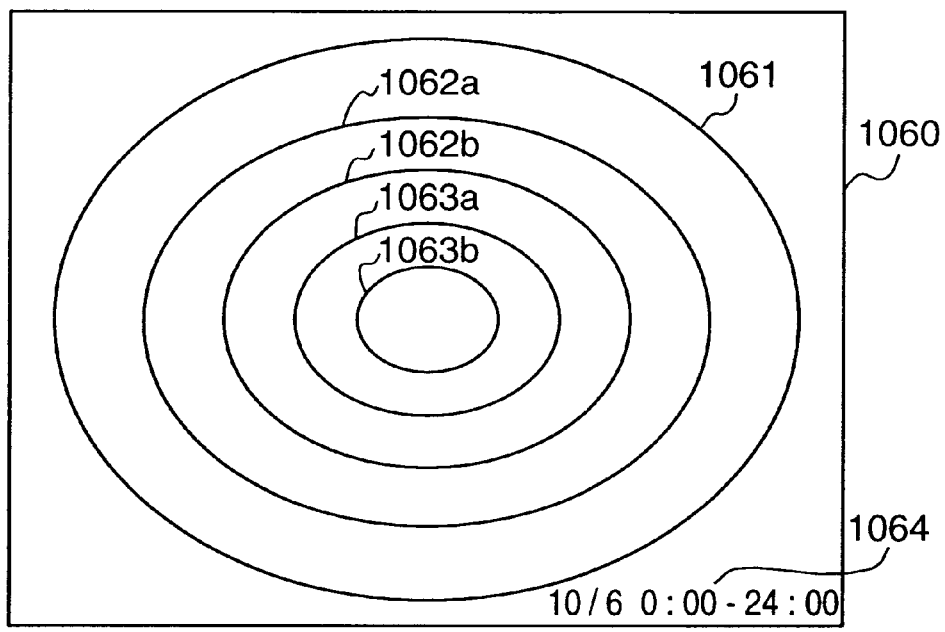
FIG. 17 is an explanatory view for explaining displayed form of rings according to the third embodiment.

Upon displaying data icons corresponding to the data items, they are displayed as traversing the hierarchical cells. The cell on which data items are concentrated is divided into cells representing minutes, further into cell representing seconds, thus the period represented by each cell becomes short. In order to clearly show to a user that the periods represented by some rings are short, the rings are displayed in lighter colors as the periods become shorter, as shown in FIG. 17. Note, in FIG. 17, data icons are not shown for the sake of clarity.

In FIG. 17, reference numeral 1060 denotes a display screen, and the outermost ring in the display screen 1060 is a ring 1061. The ring 1061 is displayed in the darkest color for showing that it is a day cell. Here, it is assumed that the ring 1061 represents October 6. Next, rings 1062a and 1062b are six-hour cells (e.g., from 0:00 to 6:00 and from 6:00 to 12:00), and they are displayed in a lighter color than the ring 1061. Further, rings 1063a and 1063b are hour cells (e.g., 12:00 to 13:00 and 13:00 to 14:00), and they are displayed in a lighter color than the rings 1062a and 1062b. In the lower-right corner of the display screen 1061, a period of time 1064 showing a period represented by the outermost ring, i.e., the ring 1061 is displayed. According to the aforesaid display method, a user is able to take enough time to see data icons while recognizing changes in period represented by each ring when a number of data items are concentrated in a certain period.

Further, depending upon whether or not the number of data items which belong to a certain cell is larger than a predetermined value, whether or not a cell is to be divided is determined. This predetermined value is set to the maximum number of data icons which can be displayed on a single ring. In the third embodiment, the maximum of eight data icons are arranged on one ring as shown in FIG. 14. Accordingly, the predetermined number is also set to eight.

Figure 18:
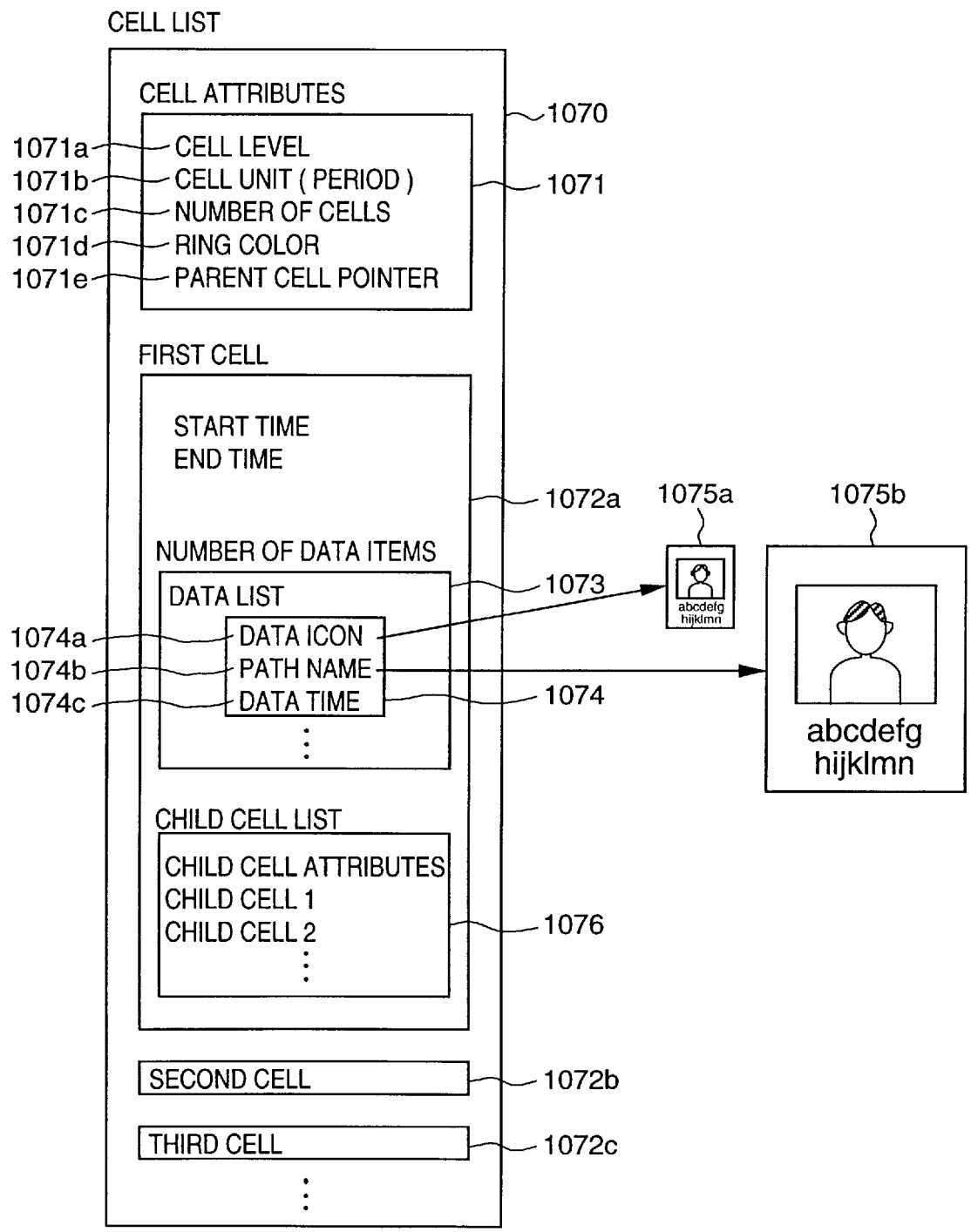
FIG. 18 is a view showing data structure of a cell list according to the third embodiment.

FIG. 18 is a view showing a data structure of a cell list according to the third embodiment. In FIG. 18, reference numeral 1070 denotes a cell list. The cell list 1070 includes cell attributes 1071 showing attributes of cells on the cell list 1070. The cell attributes 1071 stores a cell level 1071a indicating that to which hierarchy the cells belong. For example, the day cells shown in FIG. 16 are basic cells, therefore, their cell level is 0. Six-hour cells are in the cell level 1, and hour cells are in the cell level 2. Reference numeral 1071b is a cell unit (period of time). Referring to FIG. 16, the cell unit 1071b is 24 hours for the day cells, six hours for the six-hour cells, and one hour for the hour cells. Further, the number of cells 1071c represents the number of cells which are registered on the cell list 1070. A ring color 1071d indicates the color to be used when rendering rings representing the cells on the list. In the third embodiment, the ring color 1071d is black (V(O)=0) when the cell level 1071a is 0, and in response to the level number N, the ring color 1071d is set to V(N)=(255−V(N-1))/2). Further, a parent cell pointer 1071e stores a pointer used for returning from a child cell list to its parent cell. Here, for example, the six-hour cells are child cells of a day cell, and the hour cells are child cells of the six-hour cell, and conversely, the day cell is a parent cell of the six-hour cells, and the six-hour cell is a parent cell of the hour cells. Note, since there is no parent cell when the cell level 1071a is 0, therefore, no value is stored in the pointer. For example, child cell attributes in a child cell list 1076 includes a pointer to the first cell 1072a.

Next, cells 1072a, 1072b and 1072c which belong to the cell list 1070 are listed sequentially. In each cell, information on start time and end time of the cell, and on the number of data items included in the cell. In a data list 1073, data information which belongs to the cell is stored. Each data item includes a data icon 1074a, a path name of the data 1074b, and data time 1074c as shown by 1074. The data icon 1074a is a bitmap image, as shown by 1075a, obtained by reducing actual data 1075b. Further, a data file on a disk can be referred by using the path name of the data 1074b. The data time 1074c is data time when the data becomes belonging to the cell. In the file management system, generation time of data, or correction time of data is the data time 1074c.

Whether or not the number of the data items is larger than a predetermined value (maximum number of data icons which can be arranged on a single ring) is determined when adding a new data item on the data list by checking the number of data items. In the displayed example explained with reference to FIG. 14, when the number of data items which belong to a given cell becomes greater than eight, the child cell list 1076 which includes cells obtained by dividing the original cell (i.e., parent cell) is generated. The child cell list 1076 has the same structure as that of the cell list 1070.

When the child cell list 1076 is generated, data items belonging to the first cell 1072a are moved to the child cells of the child cell list 1076 in dependence upon the data time, and erased from the first cell 1072a. Therefore, when there is the data list 1073 in the first cell 1072a, the child cell list 1076 does not exist, conversely, when there is the child cell list 1076, the data list 1073 does not exist. Note, the child cell attributes include the cell level whose value is obtained by incrementing the cell level of its parent cell attributes by one, and a ring color which is lighter than that of its parent cell attributes.

Figure 19:
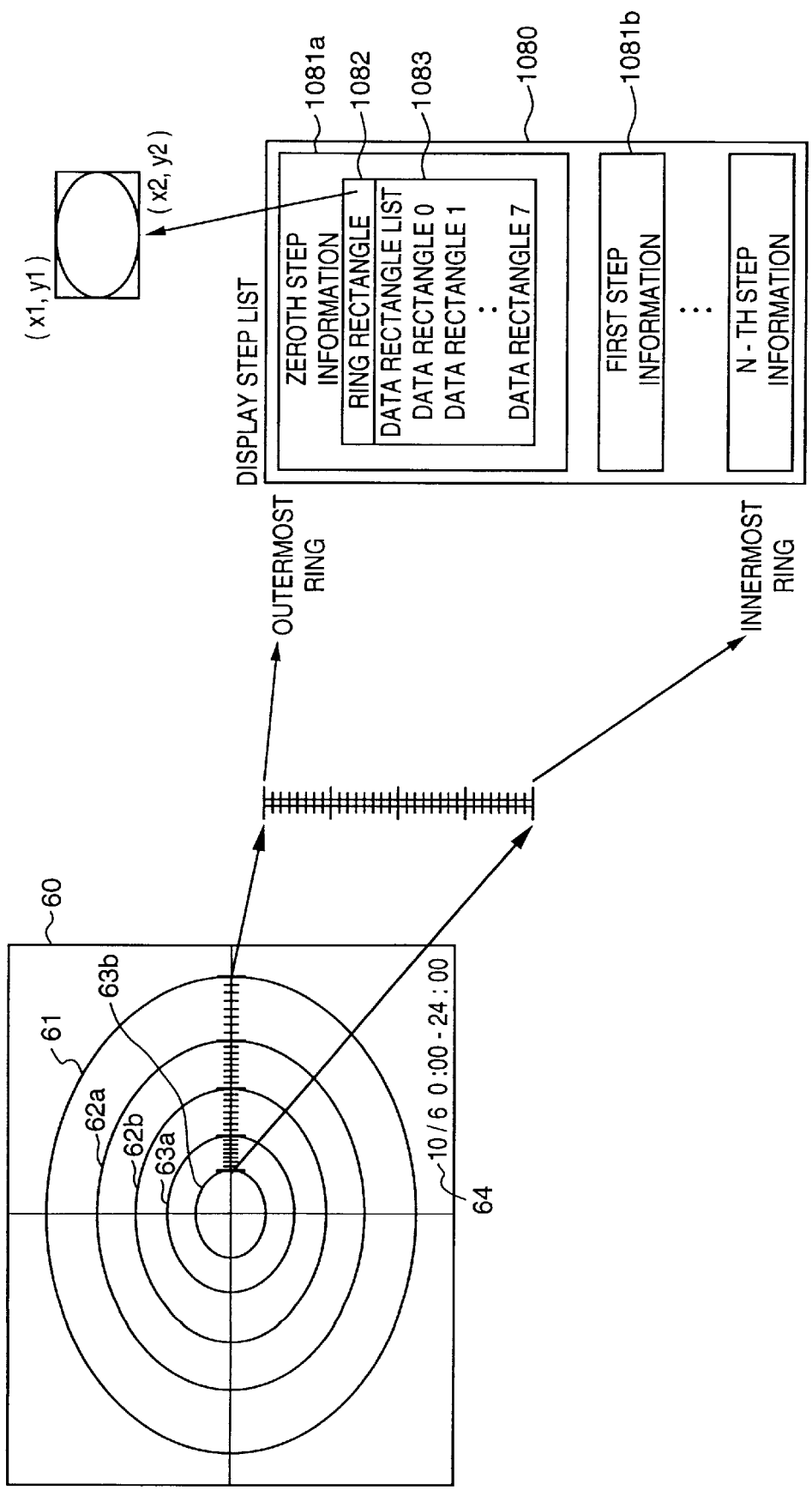
FIG. 19 is a view showing a data structure for display management.

Next, an initial displaying operation for displaying data icons as shown in FIG. 14 will be explained. FIG. 19 is a view showing a data structure for display management. When displaying rings and data icons while zooming in or out, the rings are moved by an amount obtained by dividing the distance between the outermost ring and the innermost ring by 32 as one step. Further, the new rings are generated at every eight steps. In other words, the distance between each ring is eight-step distance.

The size and position of a ring and the size of data icons displayed on the ring at each step is shown in a display step list 1080. This is a list corresponds to each of 32 steps, as described above, and plural pieces of step information 1081a, 1081b, and so on, for respective steps are stored in the list. In each piece of the step information, the following information is included. A ring rectangle 1082 represents a rectangle which circumscribes a ring at a corresponding step (upper-left coordinates (x1, y1) and the lower-right coordinates (x2, y2)). Further, a data rectangle list 1083 indicates the size of data icons to be displayed on the ring. Accordingly, the shape and size of the ring is an ellipse which is inscribed in the ring rectangle 1082, and the sizes and positions of the data icons are determined by data rectangles 0 to 7 in the data rectangle list 1083. Note, in the third embodiment, the number of data icons to be displayed on each ring is eight, thus each data rectangle list has eight data rectangles each of which shows information on both size and display position of a data icon.

Further, the displayed sizes of the data icons on rings are set so as to gradually increase as the size of the rings increase. The sizes of rings and data icons may change linearly or may increase rapidly in the middle, or other various ways for changing the sizes would be considered. Further, it is possible to combine plural ways for changing the sizes in accordance with a user's preference. Note, when a user sets the sizes of the rings and data icons, it is preferred to store ring rectangles and data rectangles at each step corresponding to various ways for changing the sizes in a form of table so that calculation for obtaining the sizes and positions of rings and data icons does not have to be performed when performing zooming-in and zooming-out operation.

Figure 20:
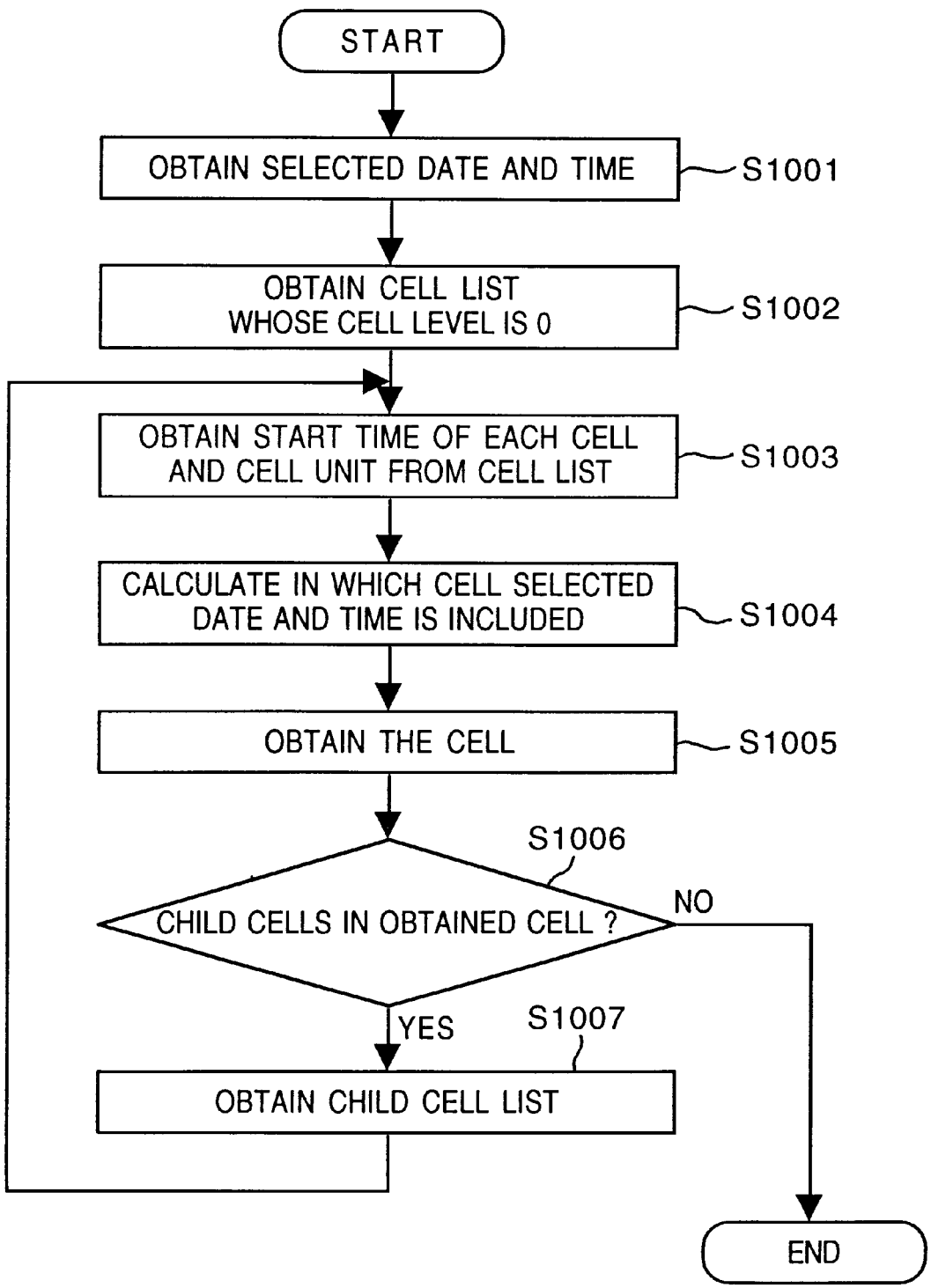
FIG. 20 is a flowchart showing an operational sequence for obtaining a cell to be displayed in the outermost ring.

FIG. 20 is a flowchart showing an operational sequence for obtaining a cell to be displayed as the outermost ring. In step S1001, a selected date and time is obtained. As the selected date and time, the current date and time is used basically. Further, when a user clearly designates date and time, the designated date and time is used. Next in step S1002, a cell list whose cell level 1071a is 0 is obtained. In step S1003, the cell unit 1071b (period) and the start time of each cell in the cell list is obtained. In step S1004, in which cell the designated date and time is included is calculated on the basis of the information obtained in the former steps, and the cell including the designated date and time is obtained in step S1005. In step S1006, whether or not there are child cells in the cell is checked. If there is, the child cell list is obtained in step S1007, and the processes from step S1003 are repeated. If all the child cells are checked, it means that the designated date and time is included in the cell of interest, thus the processing is completed.

Figure 21:
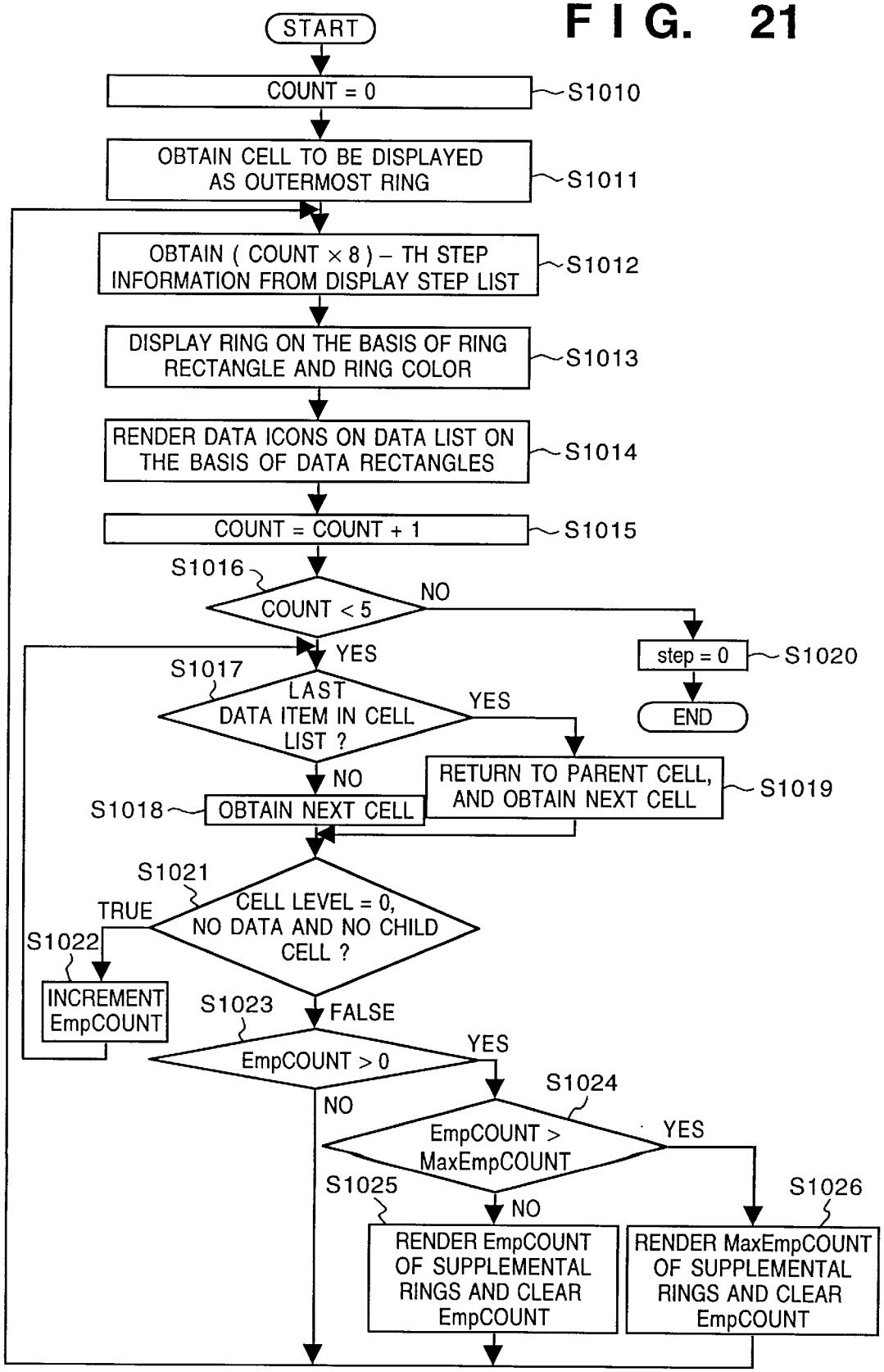
FIG. 21 is a flowchart showing an operational sequence for initial display according to the third embodiment.

FIG. 21 is a flowchart showing an operational sequence for initial display according to the third embodiment. In step S1010, the value of COUNT is initialized to 0. In step S1011, the cell to be displayed as the outermost ring obtained in the processing shown in the flowchart in FIG. 20 is obtained. In step S1012, the (COUNT×8)-th step information is obtained from the display step list 1080. Since the value of the COUNT is 0, here, the zeroth step information 1081a is obtained. In step S1013, the ring rectangle 1082 is obtained from the obtained (zeroth) step information, as well as the ring color 1071d is obtained from the cell attributes of the cell. Then, a ring is rendered in the color designated by the obtained ring color 1071d, in the size and at the position designated by the ring rectangle 1082.

In step S1014, data icons on the data list of the cell are sequentially obtained one by one, and rendered at display positions designated by the data rectangle 1083 in the size also designated by the data rectangle 1083. In the third embodiment, maximum of eight data icons are sequentially rendered at the eight positions from the top-center position in the clockwise direction.

Figure 22:
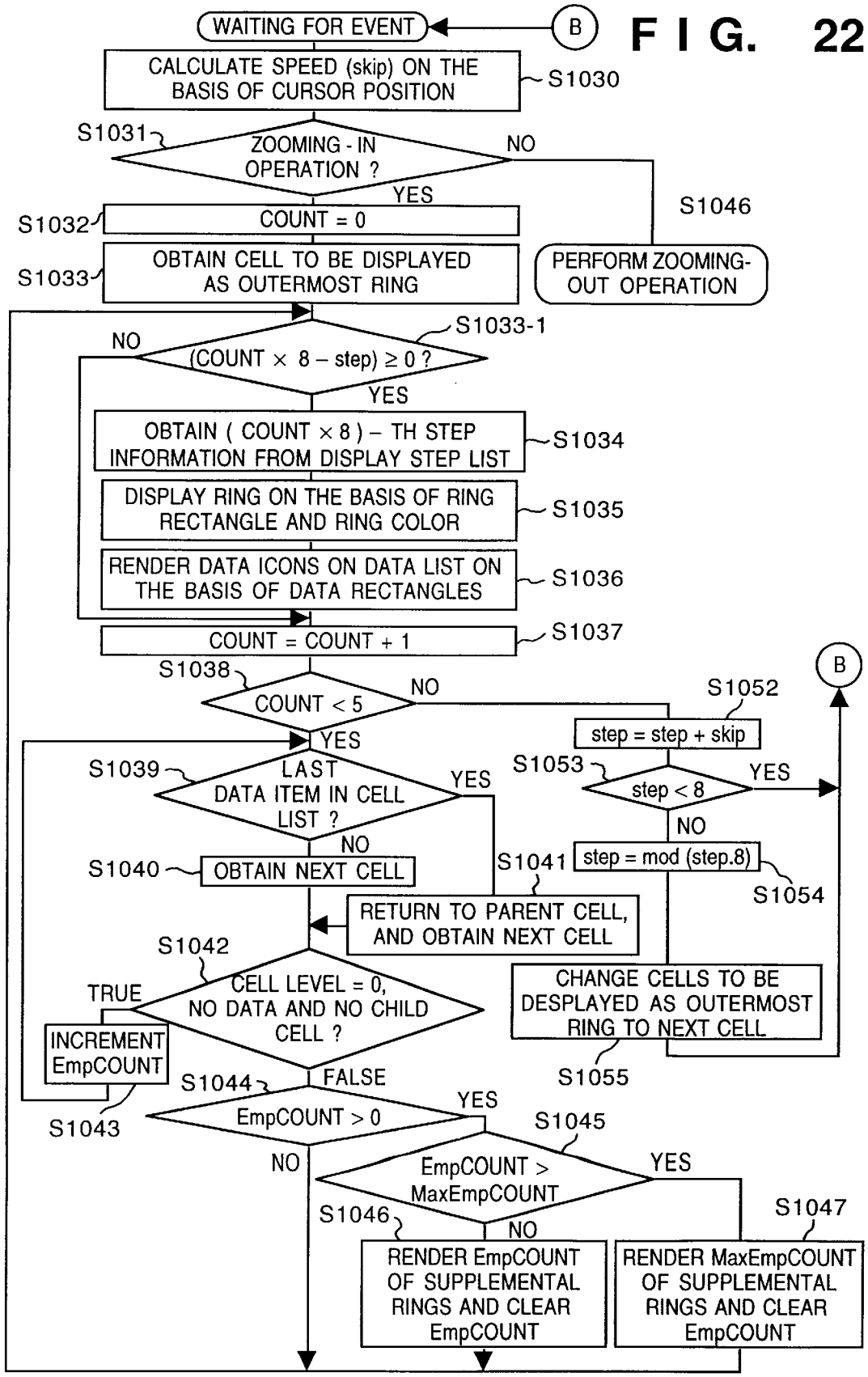
FIG. 22 is a flowchart for explaining a processing sequence when performing zooming-in and zooming-out operation according to the third embodiment.
Figure 23:
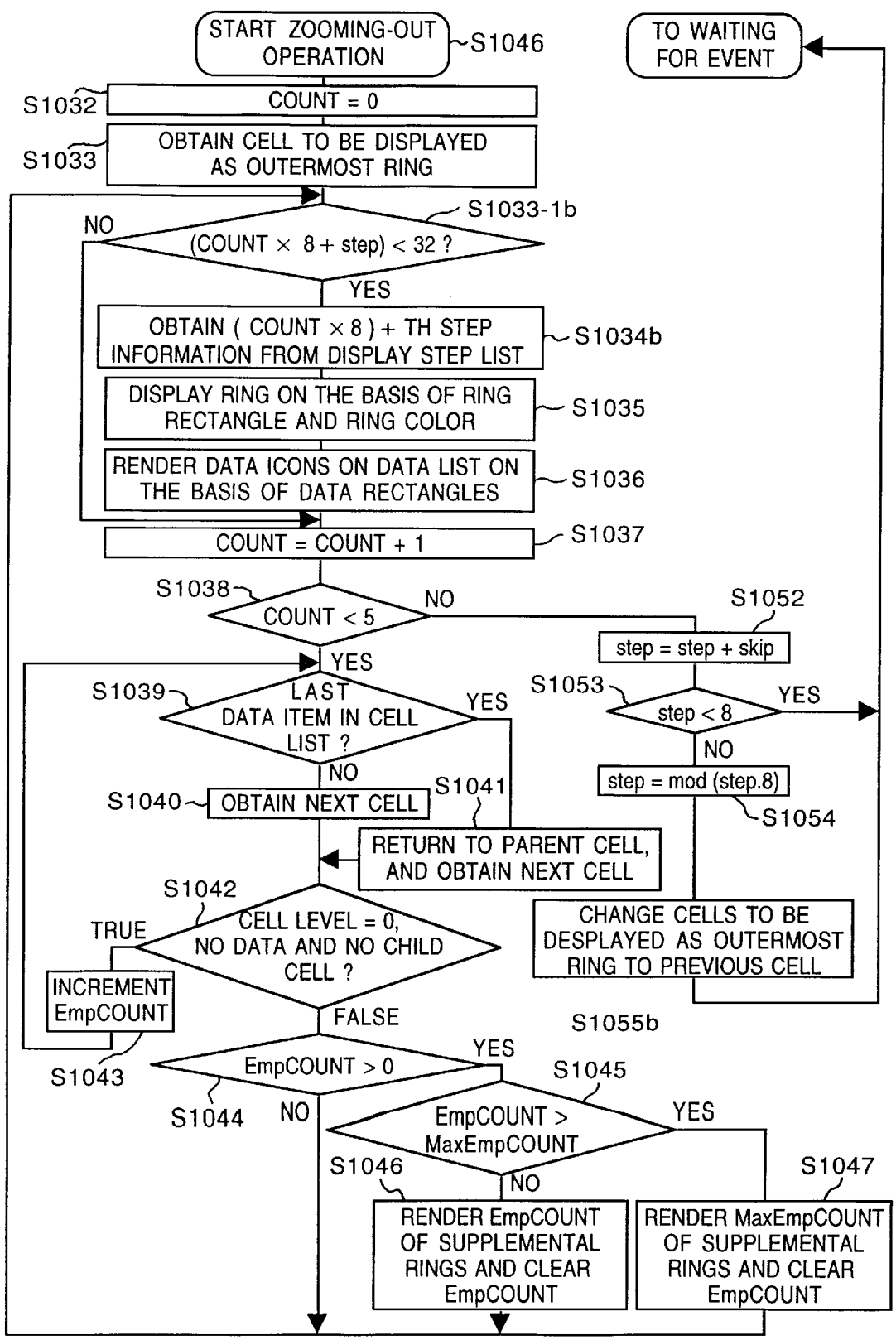
FIG. 23 is a flowchart for explaining a processing sequence when performing zooming-in and zooming-out operation according to the third embodiment.

In step S1015, the value of the COUNT is incremented by one, and whether it reached the number, five, which is the number of rings rendered at one time in a display screen, or not is determined in step S1016. If five rings have been rendered, the process proceeds to step S1020, where a variable "step" which is used in the zooming-in and zooming-out operation which will be explained later with reference to FIGS. 22 and 23 is set to 0, then the processing is completed.

If the value of the COUNT is less than five, then whether the data icon rendered in step S1014 is of the last data item (i.e., oldest data item) in the cell list of interest or not is checked in step S1017. If it is not of the last data item, the process proceeds to step S1018, and the next cell is obtained. Whereas, if it is of the last data item in the cell list, then the process proceeds to step S1019, where the process returns to the parent cell by referring to the parent cell pointer 1071e, then the next cell in the parent cell list is obtained.

Next in step S1021, whether or not the obtained cell is a cell whose cell level is 0 which indicates that the cell is a day cell, and whether or not the obtained cell does not have data and child cells is checked. If true, it means that there is no data in the cell corresponding to the day, therefore, the cell is rendered as a supplemental ring later. In order to keep the number of supplemental ring or rings to be rendered later, EmpCOUNT is incremented by one in step S1022, thereafter, the process returns to step S1017.

Whereas, if it is determined in step S1021 that there is data or child cells, the process proceeds to step S1023. In step S1023, whether or not the EmpCOUNT is larger than 0 is checked to determined whether or not a supplemental ring or rings have to be displayed. If Yes, the process proceeds to step S1024, and the EmpCOUNT is compared to the maximum number of supplemental rings to be displayed, MaxEmpCOUNT. If the EmpCOUNT is greater than the MaxEmpCOUNT, then the MaxEmpCOUNT of supplemental rings are rendered and the EmpCOUNT is reset to 0 in step S1026. Further, if EmpCOUNT is equal or less than MaxEmpCOUNT, then the EmpCOUNT of supplemental rings are rendered and EmpCOUNT is reset to 0 in step S1025.

Note, supplemental rings are rendered between the ring displayed previously and the next ring. The position or positions of supplemental rings are selected so that the intervals between the rings (previous ring, next ring, and supplemental ring or rings) become the same. For example, when rendering one supplemental ring, the position of the supplemental ring is at "position of the previous ring+four steps", and when rendering two supplemental rings, then at "position of the previous ring+three steps" and "position of the previous ring+six steps" for instance.

Then the process returns to step S1012 via the aforesaid steps S1023 and S1025 or step S1026. In step S1012, since the (value of COUNT×8)-th step information is obtained, the eighth step information is obtained in this routine. This is because rings are displayed at eight-step interval. Thereafter, the aforesaid processes are repeated. The initial rendering is performed in the above manner, and the image such as the one shown in FIG. 14 is obtained as a result.

Next, algorithms used in the zooming-in and zooming-out operations are explained. FIGS. 22 and 23 are flowchart for explaining processing sequences when performing the zooming-in and zooming-out operations according to the third embodiment.

In the third embodiment, a user is allowed to change the speed for zooming-in or zooming-out on the displayed contents among eight different speeds, and the speed is designated by a cursor controlled by the mouse. Further, while the user is pressing the left button of the mouse, the zooming-in operation is performed, whereas, while the user is pressing the right button of the mouse, the zooming-out operation is performed. If the position of the cursor controlled by the mouse is in the central part of the display screen, the speed of zooming in or zooming out of the displayed contents is fast, whereas, if the position of the cursor is in the periphery of the display screen, the speed of zooming in or zooming out of the displayed contents is slow.

First, in step S1030, the speed is calculated on the basis of the position of the cursor controlled by the mouse. When the distance d is from the center of the display screen to the position of the cursor, then the speed ("skip") is calculated in accordance with the following equation:

skip=8−*int*((*d*/distance from the center to the edge of the display screen)×8)

Next in step S1031, whether or not the zooming-in operation is designated is determined, and the process branches accordingly. More specifically, if the left button of the mouse is pressed, the zooming-in operation is designated, therefore, the process proceeds to step S1032. If the right button of the mouse is pressed, the zooming-out operation is designated, therefore, the process moves to step S1046 where the zooming-out operation starts. Here, the zooming-in operation is explained, first.

The processes performed in steps S1032 to S1047 are basically the same as those performed in steps S1010 to S1026 in FIG. 21. The difference is that a ring is rendered at a (COUNT×8−"step")-th position in step S1034. This "step" is initialized to 0 in step S1020 in FIG. 21, and it is incremented by an amount of "skip" in the zooming-in operation (in step S1052). Accordingly, data icons are displayed as they are zoomed-in at the designated speed, i.e., "skip".

Further, in a case where it is determined that the (COUNT×8−"step") is smaller than 0 in step S1033-1, it means that the outermost ring has disappeared from the display screen, therefore, no process for rendering the outermost ring and data icons to be displayed on the ring is performed, and the process moves to step S1037.

In the processes performed in steps S1032 to S1047, all the rings and data icons to be displayed are displayed. The operation for displaying supplemental ring or rings performed in steps S1042 to S1047 is the same as that performed in steps S1021 to S1026 in FIG. 21.

In steps S1052 to S1055, processes to prepare for the next zooming-in or zooming-out operation are performed. In step S1052, "step" is increased by the amount of "skip". For example, when the zooming-in operation is performed with placing the cursor of the mouse at the center of the display screen, since "skip"=8 in step S1030, therefore, "step" increments by eight. Further, when the zooming-in operation is performed by placing the cursor of the mouse at the periphery of the display screen, "skip"=1, therefore, "step" increments by one.

With the aforesaid control, data icons can be moved at a desired speed when performing the zooming-in operation in accordance with how the data icons are displayed on the display screen. Further, when a user releases the button of the mouse, the "event" which triggers to proceeds to the flowchart shown in FIG. 22 does not occur, therefore, displayed contents are not changed, and the user is able to see the data icons on the display screen without haste. If "step" is more than eight in step S1053, then the fraction part obtained by dividing "step" by eight is set to "step", and the cell to be displayed as the outermost ring is changed to the next one in the cell list in step S1055. When the "step" is less than eight, the process becomes a state for waiting for an event to occur. When the left button is kept pressed, the same event occurs one after another, and the aforesaid processes are performed repeatedly.

Next, with regard to the zooming-out operation, processes which differ from the zooming-in operation are explained. The operation of the zooming-out operation is shown in FIG. 23. Basically, opposite processes to those for performing the zooming-in operation are performed. Details are as below. In step S1033-1*b*, if (COUNT×8+"step") is equal or greater than 32, since the ring is too small to display at the (COUNT×8+"step")-th step position, therefore, the process moves to step S1037. Whereas, if (COUNT×8+"step") is less than 32, then the (COUNT×8+"step")-th step information is obtained in step S1034*b*.

Further, among the processes in step S1052 and its subsequent steps, the cell to be displayed as the outermost ring is changed to the previous cell in the cell list in step S1055*b*.

Figure 24:
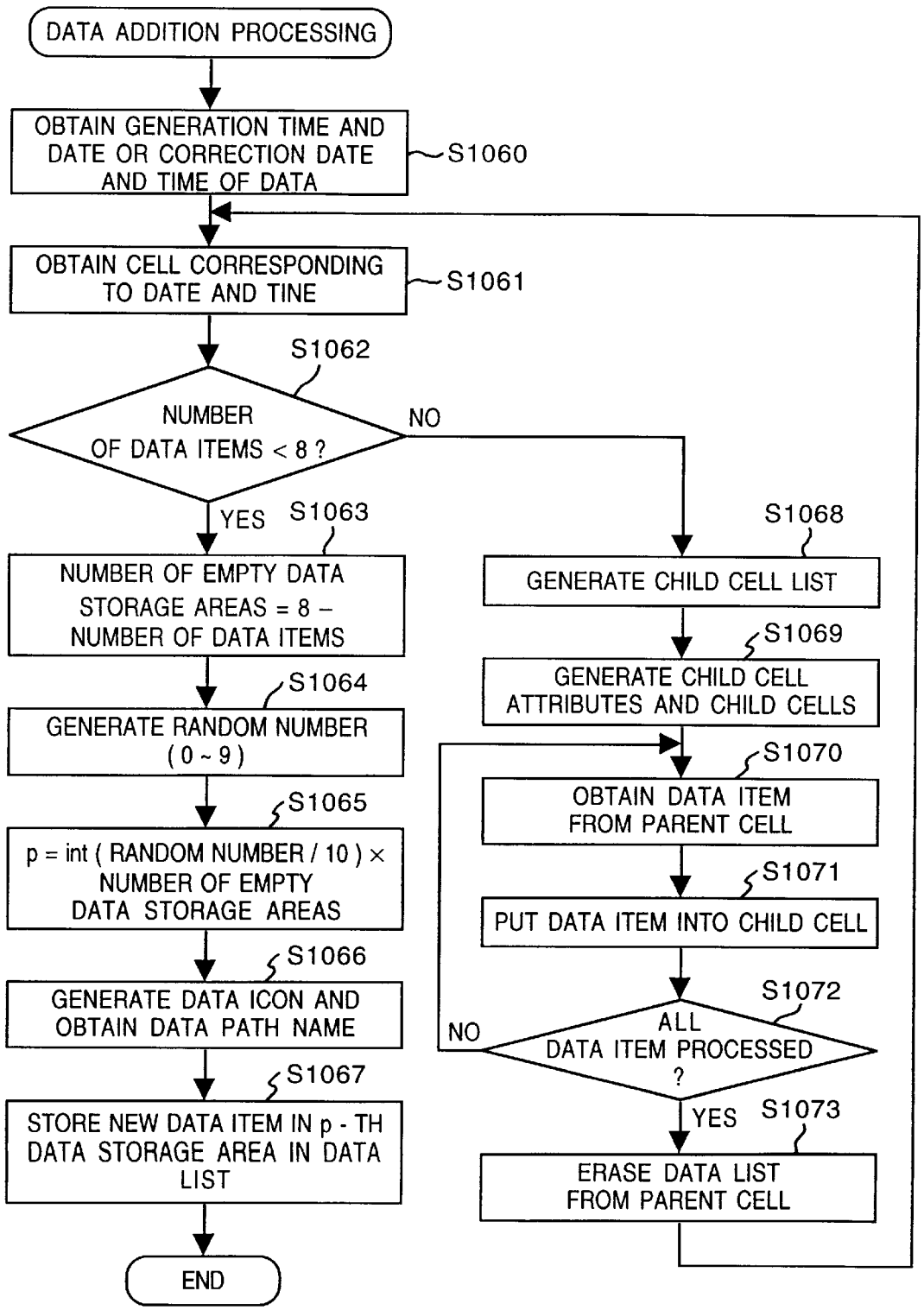
FIG. 24 is a flowchart showing an operational sequence of data addition processing according to the third embodiment.
Figure 25:
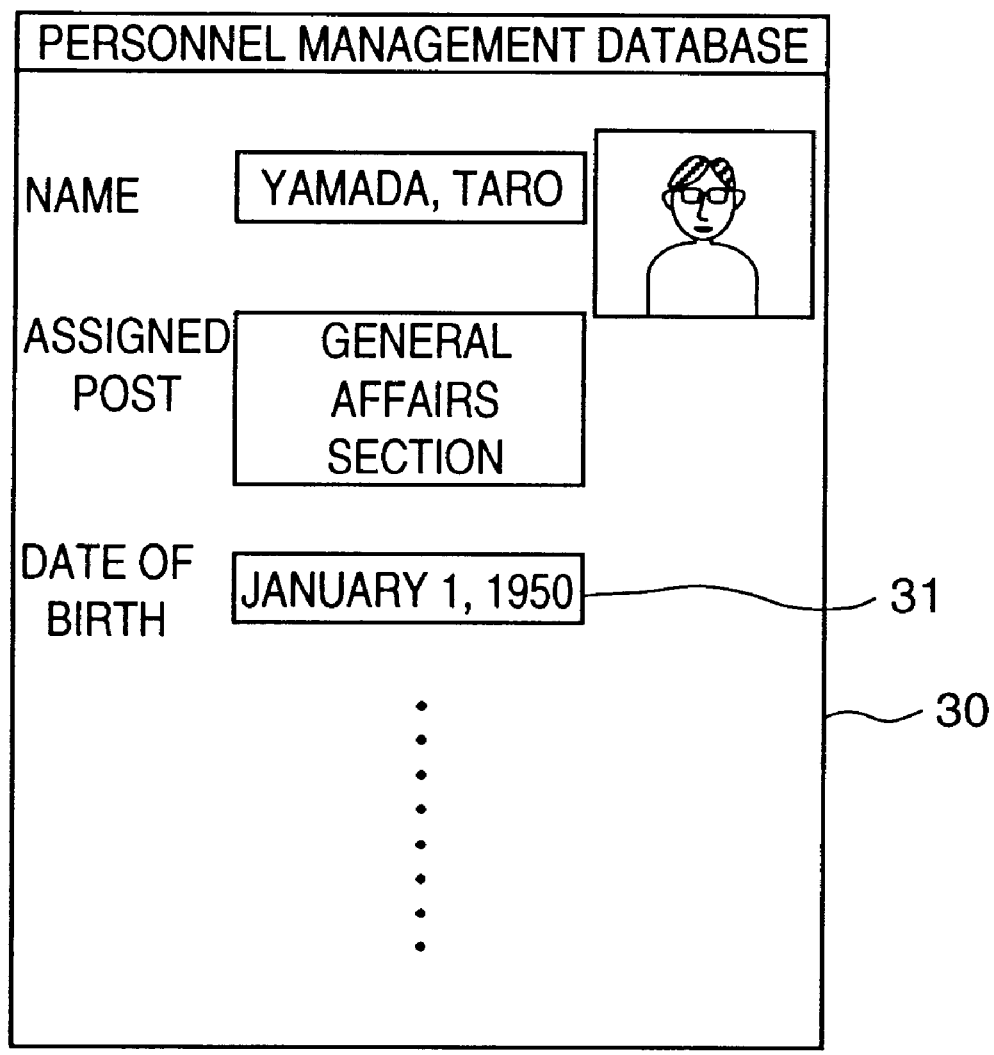
FIG. 25 is a view showing a data structure of a general personnel management database.
Figure 26:
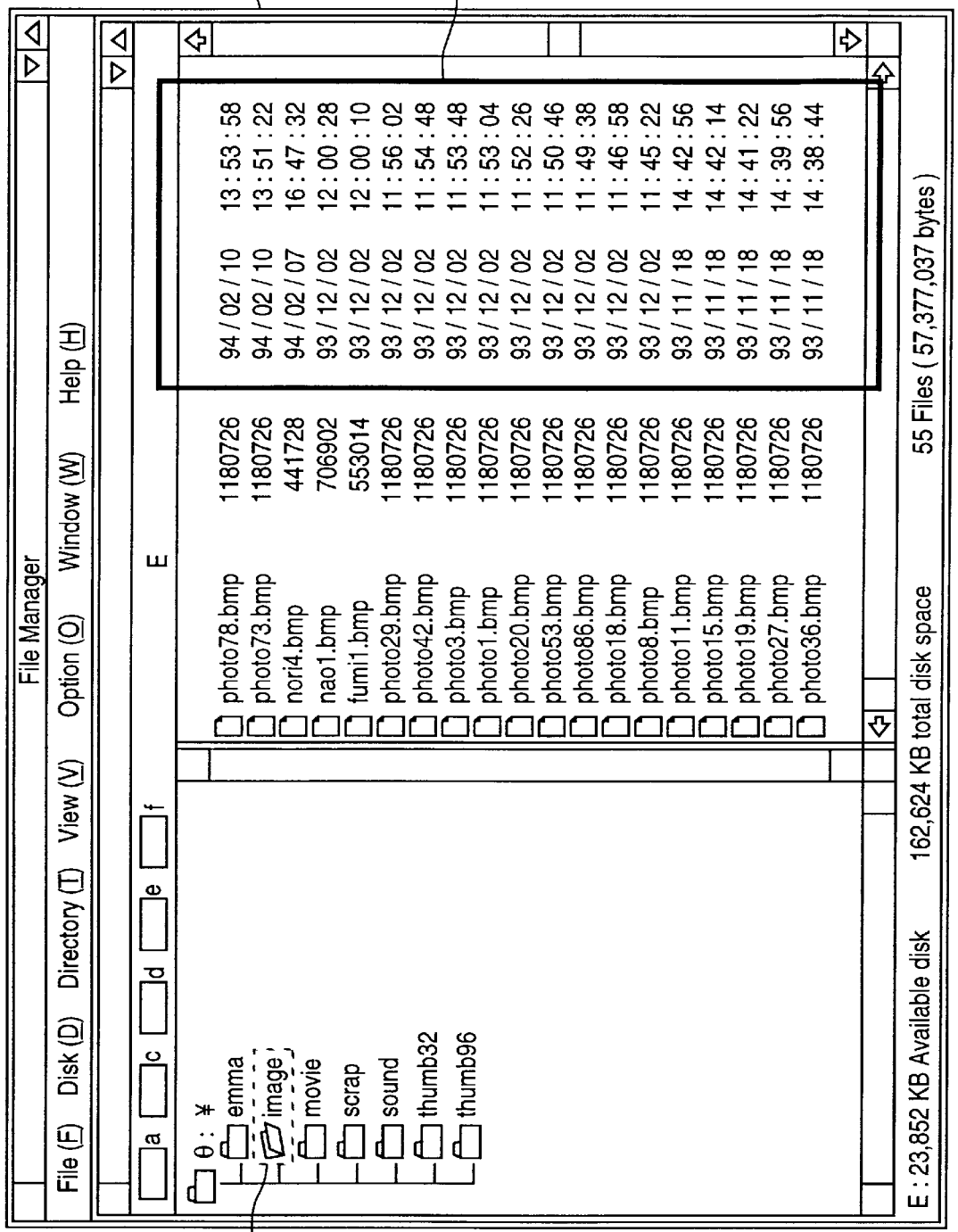
FIG. 26 is a view showing an example of displayed files by a general file management system.

The zooming-in and zooming-out operations are performed as described above. Next, processing when new data is added is explained. FIG. 24 is a flowchart showing an operational sequence of data addition processing according to the third embodiment.

In step S1060, generation date or correction date of data is obtained. Here, in a case where a data file is newly added, the generation date is obtained, and in a case where correction is applied to a data file, then the correction date is obtained. In step S1061, a cell corresponding to the date and time is obtained. The cell can be obtained by performing the same processes as those in step S1002 to S1007 in FIG. 20. Next, the number of data items registered in the data list in the obtained cell is checked to determine whether or not the number is less than eight. If less than eight, then the number of empty data storage area or areas, where new data items can be stored, in the data list is calculated in step S1063. Then in step S1064, a random number between 0 to 9 is generated. The random number may be generated by taking the least place of the second of the time then, for example. On the basis of the random number, the empty data storage area or areas for storage of the new data item is calculated in step S1065 in accordance with the following equation:

*p*=*int*((random number/10)×number of empty data storage areas), where p is the selected empty data storage area where the new data item is to be stored. Thereby, data items are not stored from the top of the data list, but they are stored in random order in the eight data storage areas in the data list. This is because the first data item on the data list is displayed at the top center of the ring, and subsequent data items are displayed in the clockwise order sequentially. Therefore, if data item or items are stored from the top of the data list, a data icon is always displayed at the top center position of each ring and the position which is to the left of the top center position of each ring may be often left empty, for example. Thus, if data icons are displayed in this manner, the whole display screen is not effectively used.

Further, there is a method of putting data icons of data items which are stored from the top of the data list at random positions when displaying them, however, a user often memorizes a displayed position of a data icon whose original data the user frequently uses. Therefore, it is preferred that display positions of data icons are fixed. With this reason, the method explained in the above paragraphs is adopted in the third embodiment. Next, by pursuing the empty data storage area or areas in the data list in step S1067, and in the p-th empty data storage area, the data icon, the path name of a data file and data time obtained in step S1066 are stored.

Whereas, if the number of data items are eight and there is no empty data storage area in the data list, in step S1062, processing for making child cells and moving data items to the child cells is performed. In step S1068, a child cell list is generated while setting the original cell as a parent cell in step S1068. Then in step S1069, child cell attributes and child cells are generated. Next, a data item is obtained from the parent cell in step S1070. In step S1071, data is put in corresponding child cells generated in step S1069 on the basis of data time of the data item obtained in step S1070. In step S1072, whether or not the aforesaid processes are performed on all the data items in the data list of the parent cell is determined. If all the data items have been processed, then the process proceeds to step S1073, where the data list is erased from the parent cell. Thereafter, the process returns to step S1061 and registration of a new data file is performed.

According to the third embodiment as described above, in a system for displaying data icons on rings which nest in temporal order, when time interval between a ring on which a data icon exists and the next ring on which another data icon exists is longer than a predetermined period, the supplemental ring or rings are displayed in correspondence to the interval. Accordingly, it is possible to visually express time intervals between data items so that a user can have a sense of the time intervals. Further, it is possible to effectively display a plurality of data items whose generation time and/or correction time are at a long time intervals.

According to the second and third embodiments as described above, upon displaying data icons in temporal order on the basis of time stored in connection to data, it is possible to display data icons representing data in such a manner that not only good display efficiency is maintained, but also time intervals between the generation and/or correction time of data can be easily sensed by a user.

The present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 27:
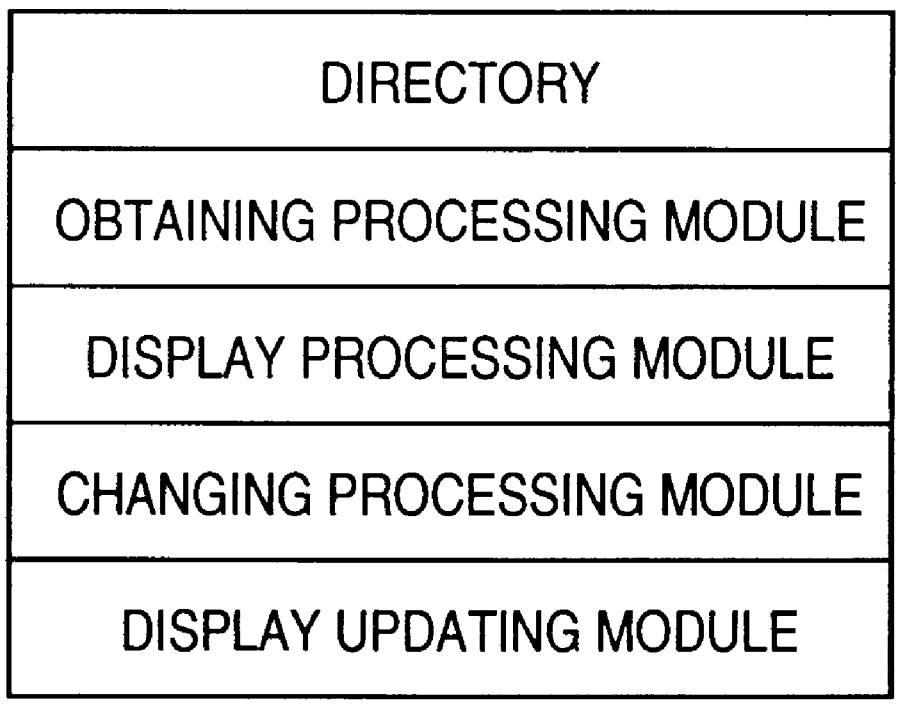
FIG. 27 is a view showing an example of a memory map of a storage medium storing a control program according to the present invention.

In a case where the present invention is applied to the aforesaid storage medium, the storage medium stores program codes corresponding to the flowcharts described in the embodiments. Briefly, the storage medium stores each module shown as an example of a memory map in FIG. 27.

More specifically, program codes which correspond to "obtaining processing module", and "display processing module", at least, are to be stored in the storage medium. Preferably, "changing processing module" and "display updating processing module" are also stored in the storage medium.

Note, the "obtaining processing module" performs obtaining processing for obtaining temporal information owned by each of a plurality of data items stored in the storage medium. Further, "display processing module" performs displaying processing for displaying information showing a data item at a position, corresponding to time indicated by the temporal information obtained in the obtaining processing, on a time axis which includes arrangement positions each of which correspond to time in each predetermined period.

Furthermore, the changing processing module performs changing processing for changing time assigned to each arrangement position on the time axis collectively to an earlier time or to a later time by a predetermined time. The display updating processing is for updating the displayed contents of information indicating data items displayed at the arrangement positions in the displaying processing on the basis of the time changed by the changing processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
   first display means for displaying a locus having a plurality of arrangement positions where icons are displayed;
   setting means for setting a predetermined period of time to each of the plurality of arrangement positions;
   storage means for storing a plurality of data items;
   obtaining means for obtaining temporal information of the plurality of data items stored in said storage means; and
   second display means for displaying icons representing the plurality of data items at the arrangement positions corresponding to time indicated by temporal information obtained by said obtaining means,
   wherein the locus has a spiral shape and wherein said second display means reduces display sizes of the icons toward a center of the spiral.

2. The information processing apparatus according to claim 1, wherein the plurality of arrangement positions are intersections between a plurality of lines which spread from the center of the spiral in the radial direction and the spiral.

3. The information processing apparatus according to claim 1, wherein, when there are a plurality of data items between two arrangement positions, said second display means displays icons representing the plurality of data items in a range between the corresponding arrangement position and a next arrangement position.

4. The information processing apparatus according to claim 1 further comprising:
   changing means for changing periods of time assigned to the respective arrangement positions on the locus collectively to an earlier time or to a later time; and display updating means for updating displayed contents of information representing data items displayed by said second displaying means on the basis of the periods of time changed by said changing means.

5. The information processing apparatus according to claim 4 further comprising another setting means for setting a predetermined amount of time as a changing amount used by said changing means on the basis of contents of designation for changing operation.

6. The information processing apparatus according to claim 4, wherein, when latest time of the time axis is later than latest time of time information of the plurality of data items stored in said storage means, said changing means sets time for displaying information indicating a data item having earliest time information in the time information of the plurality of data items to one of the plurality of arrangement positions which corresponds to the latest time of the time axis.

7. The information processing apparatus according to claim 4, wherein when latest time of the time axis is earlier than earliest time of time information of the plurality of data items stored in said storage means, said changing means sets time for displaying information indicating a data item having latest time information in the time information of the plurality of data items to one of the plurality of arrangement positions which corresponds to the latest time of the time axis.

8. An information processing apparatus comprising:
first display means for displaying a locus having a plurality of arrangement positions where icons are displayed;
obtaining means for obtaining temporal information of a plurality of stored data items;
second display means for assigning the plurality of data items to the plurality of arrangement positions, respectively, in temporal order on the basis of the time information obtained by said obtaining means and displaying icons corresponding to the respective data items at the respective arrangement positions; and
control means for, when a time interval between two of the plurality of data items having adjacent time information to each other exceeds a predetermined value, setting an arrangement position to which no data item is assigned between the arrangement positions, out of the plurality of arrangement positions, to which the two data items are assigned,
wherein the locus has a spiral shape and wherein said second display means reduces display sizes of the icons toward a center of the spiral.

9. The information processing apparatus according to claim 8, wherein, when there are a plurality of data items whose time information indicates time which is in a period of time corresponding to one of the plurality of arrangement positions, said second display means displays icons representing the plurality of data items in a range between the corresponding arrangement position and a next arrangement position.

10. An information processing apparatus comprising:
first display means for displaying a locus having a plurality of arrangement positions where icons are displayed;
obtaining means for obtaining temporal information of a plurality of stored data items;
second display means for assigning the plurality of data items to the plurality of arrangement positions, respectively, in temporal order on the basis of the time information obtained by said obtaining means and displaying icons corresponding to the respective data items at the respective arrangement positions; and
third display means for, when a time interval between the time information of two of the plurality of data items which are assigned to adjacent arrangement positions of the plurality of arrangement positions on the locus exceeds a predetermined period of time, displaying an indicator to indicate the above condition between the adjacent arrangement positions,
wherein, when time difference between the time information of two of the plurality of data items which are assigned to adjacent arrangement positions of the plurality of arrangement positions on the locus exceeds a predetermined period of time, said third display means displays a symbol indicating the above condition between the adjacent arrangement positions.

11. The information processing apparatus according to claim 10, wherein said third display means changes the number of symbol or symbols to be displayed between the adjacent arrangement positions on the basis of the time difference.

12. The information processing apparatus according to claim 11, wherein said third display means sets a number of symbol or symbols on the basis of a value obtained by dividing the time difference by a predetermined time period.

13. The information processing apparatus according to claim 11, wherein when the time difference exceeds a predetermined value, the third display means displays a predetermined maximum limit number of symbols in all such cases.

14. An information processing apparatus comprising:
first display means for displaying a plurality of nested closed figure loci having a plurality of arrangement positions where icons are displayed;
obtaining means for obtaining time information of a plurality of stored data items;
determination means for determining a period of time corresponding to each of the plurality of closed figure loci on the basis of the time information obtained by said obtaining means;
second display means for assigning the plurality of data items to the plurality of arrangement positions, respectively, on the basis of the periods of time assigned to the respective closed figure loci and the time information obtained by said obtaining means and displaying icons corresponding to the respective data items at the respective arrangement positions; and
third display means for, when a time difference between the periods of time assigned to two adjacent closed figure loci of the plurality of closed figure loci exceeds a predetermined period of time, displaying an indicator to indicate the above condition between the adjacent closed figure loci.

15. The information processing apparatus according to claim 14, wherein, when time difference between the periods of time assigned to the adjacent two closed figure loci of the plurality of closed figure loci exceeds a predetermined period of time, said third display means displays a new closed figure locus or loci indicating the above condition between the adjacent two closed figure loci.

16. The information processing apparatus according to claim 15, wherein, when time difference between the periods of time assigned to the adjacent two closed figure loci of the plurality of closed figure loci exceeds a predetermined period of time, said third display means displays a new closed figure locus or loci a number of which depends on the time difference.

17. The information processing apparatus according to claim 16, wherein said third display means changes the number of new closed figure locus or loci to be displayed between the adjacent two closed figure loci on the basis of the time difference.

18. The information processing apparatus according to claim 17, wherein said third display means sets a number of new closed figure locus or loci on the basis of a value obtained by dividing the time difference by a predetermined time period.

19. The information processing apparatus according to claim 16, wherein, when the time difference exceeds a predetermined value, the third display means displays a predetermined maximum limit number of new closed figure loci in all such cases.

20. An information processing method comprising:
   a first displaying step of displaying a locus having a plurality of arrangement positions where icons are displayed;
   a setting step of setting a predetermined period of time to each of the plurality of arrangement positions;
   an obtaining step of obtaining temporal information of the plurality of data items stored in a storage means; and
   a second displaying step of displaying icons representing the plurality of data items at the arrangement positions corresponding to time indicated by temporal information obtained in said obtaining step,
   wherein the locus has a spiral shape and wherein, in said second displaying step, display sizes of the icons are reduced toward a center of the spiral.

21. The information processing method according to claim 20, wherein the plurality of arrangement positions are intersections between a plurality of lines which spread from the center of the spiral in the radial direction and the spiral.

22. The information processing method according to claim 20, wherein, when there are a plurality of data items between two arrangement positions, icons representing the plurality of data items are displayed in a range between the corresponding arrangement position and a next arrangement position in said second displaying step.

23. The information processing method according to claim 20, further comprising:
   a changing step of changing periods of time assigned to the respective arrangement positions on the locus collectively to an earlier time or to a later time; and
   a display updating step of updating displayed contents of information representing data items displayed in said second displaying step on the basis of the periods of time changed in said changing step.

24. The information processing method according to claim 23, further comprising another setting step of setting a predetermined amount of time as a changing amount used in said changing step on the basis of parameters for changing operation.

25. The information processing method according to claim 23, wherein, when latest time of the time axis is later than latest time of time information of the plurality of data items stored in the storage means, time for displaying information indicating a data item having earliest time information in the time information of the plurality of data items is set to one of the plurality of arrangement positions which corresponds to the latest time of the time axis in said changing step.

26. The information processing method according to claim 23, wherein when latest time of the time axis is earlier than earliest time of time information of the plurality of data items stored in the storage means, time for displaying information indicating a data item having latest time information in the time information of the plurality of data items is set to one of the plurality of arrangement positions which corresponds to the latest time of the time axis in said changing step.

27. An information processing method comprising:
   a first displaying step of displaying a locus having a plurality of arrangement positions where icons are displayed;
   an obtaining step of obtaining temporal information of a plurality of stored data items;
   a second displaying step of assigning the plurality of data items to the plurality of arrangement positions, respectively, in temporal order on the basis of the time information obtained in said obtaining step and displaying icons corresponding to the respective data items at the respective arrangement positions; and
   a control step of, when a time interval between two of the plurality of data items having adjacent time information to each other exceeds a predetermined value, setting an arrangement position to which no data item is assigned between the arrangement positions, out of the plurality of arrangement positions, to which the two data items are assigned,
   wherein the locus has a spiral shape and wherein, in said second displaying step, display sizes of the icons are reduced toward a center of the spiral.

28. The information processing method according to claim 27, wherein, when there are a plurality of data items whose time information indicates time which is in a period of time corresponding to one of the plurality of arrangement positions, icons representing the plurality of data items are displayed in a range between the corresponding arrangement position and a next arrangement position in said second displaying step.

29. An information processing method comprising:
   a first displaying step of displaying a locus having a plurality of arrangement positions where icons are displayed;
   an obtaining step of obtaining temporal information of a plurality of stored data items;
   a second displaying step of assigning the plurality of data items to the plurality of arrangement positions, respectively, in temporal order on the basis of the time information obtained in said obtaining step and displaying icons corresponding to the respective data items at the respective arrangement positions; and
   a third displaying step of, when a time interval between the time information of two of the plurality of data items which are assigned to adjacent arrangement positions of the plurality of arrangement positions on the locus exceeds a predetermined period of time, displaying an indicator to indicate the above condition between the adjacent arrangement positions,
   wherein, when time difference between the time information of two of the plurality of data items which are assigned to adjacent arrangement positions of the plurality of arrangement positions on the locus exceeds a predetermined period of time, a symbol indicating the above condition is displayed between the adjacent arrangement positions in said third displaying step.

30. The information processing method according to claim 29, wherein, in said third displaying step, the number of symbol or symbols to be displayed between the adjacent arrangement positions is charged on the basis of the time difference.

31. The information processing method according to claim 30, wherein, in said third displaying step, a number of symbol or symbols is set on the basis of a value obtained by dividing the time difference by a predetermined time period.

32. The information processing method according to claim 30, wherein, when the time difference exceeds a predetermined value, a predetermined maximum limit number of symbols are displayed in all such cases.

33. An information processing method comprising:
   a first displaying step of displaying a plurality of nested closed figure loci having a plurality of arrangement positions where icons are displayed;
   an obtaining step of obtaining time information of a plurality of stored data items;
   a determination step of determining a period of time corresponding to each of the plurality of closed figure loci on the basis of the time information obtained in said obtaining step;
   a second displaying step of assigning the plurality of data items to the plurality of arrangement positions, respectively, on the basis of the periods of time assigned to the respective closed figure loci and the time information obtained in said obtaining step and displaying icons corresponding to the respective data items at the respective arrangement positions; and
   a third displaying step of, when a time difference between the periods of time assigned to two adjacent closed figure loci of the plurality of closed figure loci exceeds a predetermined period of time, displaying an indicator to indicate the above condition between the adjacent closed figure loci.

34. The information processing method according to claim 33, wherein, when time difference between the periods of time assigned to the adjacent two closed figure loci of the plurality of closed figure loci exceeds a predetermined period of time, a new closed figure locus or loci indicating the above condition are displayed between the adjacent two closed figure loci in said third displaying step.

35. The information processing method according to claim 34, wherein, when time difference between the periods of time assigned to the adjacent two closed figure loci of the plurality of closed figure loci exceeds a predetermined period of time, a new closed figure locus or loci a number of which depends on the time difference are displayed in said third displaying step.

36. The information processing method according to claim 35, wherein, in said third displaying step, the number of new closed figure locus or loci to be displayed between the adjacent two closed figure loci is changed on the basis of the time difference.

37. The information processing method according to claim 36, wherein, in said third displaying step, a number of new closed figure locus or loci is set on the basis of a value obtained by dividing the time difference by a predetermined time period.

38. The information processing method according to claim 35, wherein, when the time difference exceeds a predetermined value, a predetermined maximum limit number of new closed figure loci are displayed in all such cases.

39. A computer program product comprising a computer usable medium having computer readable program code means embodied in said medium for storing a control program for displaying a plurality of icons corresponding to a plurality of data items, said product including:
   first computer readable program code means of a first displaying step for displaying a locus having a plurality of arrangement positions where icons are displayed;
   second computer readable program code means of a setting step for setting a predetermined period of time to each of the plurality of arrangement positions;
   third computer readable program code means of an obtaining step for obtaining temporal information of the plurality of data items stored in a storage means; and
   fourth computer readable program code means of a second displaying step for displaying icons representing the plurality of data items at the arrangement positions corresponding to time indicated by temporal information obtained in said obtaining steps
   wherein the locus has a spiral shape and wherein, in said second displaying step, display sizes of the icons are reduced toward a center of the spiral.

40. A computer program product comprising a computer usable medium having computer readable program code means embodied in said medium for storing a control program for displaying a plurality of icons corresponding to a plurality of data items, said product including:
   first computer readable program code means of a first displaying step for displaying a locus having a plurality of arrangement positions where icons are displayed;
   second computer readable program code means of an obtaining step for obtaining temporal information of a plurality of stored data items;
   third computer readable program code means of a second displaying step for assigning the plurality of data items to the plurality of arrangement positions, respectively, in temporal order on the basis of the time information obtained in said obtaining step and displaying icons corresponding to the respective data items at the respective arrangement positions; and
   fourth computer readable program code means of a control step for, when a time interval between two of the plurality of data items having adjacent time information to each other exceeds a predetermined value, setting an arrangement position to which no data item is assigned between the arrangement positions, out of the plurality of arrangement positions, to which the two data items are assigned.

41. A computer program product comprising a computer usable medium having computer readable program code means embodied in said medium for storing a control program for displaying a plurality of icons corresponding to a plurality of data items, said product including:
   first computer readable program code means of a first displaying step for displaying a locus having a plurality of arrangement positions where icons are displayed;
   second computer readable program code means of an obtaining step for obtaining temporal information of a plurality of stored data items;
   third computer readable program code means of a second displaying step for assigning the plurality of data items to the plurality of arrangement positions, respectively, in temporal order on the basis of the time information obtained in said obtaining step and displaying icons corresponding to the respective data items at the respective arrangement positions; and
   fourth computer readable program code means of a third displaying step for, when a time interval between the time information of two of the plurality of data items which are assigned to adjacent arrangement positions of the plurality of arrangement positions on the locus exceeds a predetermined period of time, displaying an indicator to indicate the above condition between the adjacent arrangement positions.

42. A computer usable medium having computer readable program code means embodied in said medium for storing a control program for controlling a processor controlled apparatus, said program code including:

first computer readable program code means of a first displaying step of displaying a plurality of nested closed figure loci having a plurality of arrangement positions where icons are displayed;

second computer readable program code means of an obtaining step of obtaining time information of a plurality of stored data items;

third computer readable program code means of a determination step of determining a period of time corresponding to each of the plurality of closed figure loci on the basis of the time information obtained in said obtaining step;

fourth computer readable program code means of a second displaying step of assigning the plurality of data items to the plurality of arrangement positions, respectively, on the basis of the periods of time assigned to the respective closed figure loci and the time information obtained in said obtaining step and displaying icons corresponding to the respective data items at the respective arrangement positions; and fifth computer readable program code means of a third displaying step of, when a time difference between the periods of time assigned to two adjacent closed figure loci of the plurality of closed figure loci exceeds a predetermined period of time, displaying an indicator to indicate the above condition between the adjacent closed figure loci.

43. An information processing apparatus comprising:

first display means for displaying a locus having a plurality of arrangement positions where icons are displayed;

setting means for setting a predetermined period of time to each of the plurality of arrangement positions;

storage means for storing a plurality of data items;

obtaining means for obtaining temporal information of the plurality of data items stored in said storage means;

second display means for displaying icons representing the plurality of data items at the arrangement positions corresponding to time indicated by temporal information obtained by said obtaining means;

changing means for changing periods of time assigned to the respective arrangement positions on the locus collectively to an earlier time or to a later time; and display updating means for updating displayed contents of information representing data items displayed by said second displaying means on the basis of the periods of time changed by said changing means, wherein, when latest time of the time axis is later than latest time of time information of the plurality of data items stored in said storage means, said changing means sets time for displaying information indicating a data item having earliest time information in the time information of the plurality of data items to one of the plurality of arrangement positions which corresponds to the latest time of the time axis.

44. An information processing apparatus comprising:

first display means for displaying a locus having a plurality of arrangement positions where icons are displayed;

setting means for setting a predetermined period of time to each of the plurality of arrangement positions;

storage means for storing a plurality of data items;

obtaining means for obtaining temporal information of the plurality of data items stored in said storage means;

second display means for displaying icons representing the plurality of data items at the arrangement positions corresponding to time indicated by temporal information obtained by said obtaining means;

changing means for changing periods of time assigned to the respective arrangement positions on the locus collectively to an earlier time or to a later time; and display updating means for updating displayed contents of information representing data items displayed by said second displaying means on the basis of the periods of time changed by said changing means, wherein when latest time of the time axis is earlier than earliest time of time information of the plurality of data items stored in said storage means, said changing means sets time for displaying information indicating a data item having latest time information in the time information of the plurality of data items to one of the plurality of arrangement positions which corresponds to the latest time of the time axis.

45. An information processing apparatus comprising:

first display means for displaying a locus having a plurality of arrangement positions where icons are displayed;

obtaining means for obtaining temporal information of a plurality of stored data items;

second display means for assigning the plurality of data items to the plurality of arrangement positions, respectively, in temporal order on the basis of the time information obtained by said obtaining means and displaying icons corresponding to the respective data items at the respective arrangement positions; and control means for, when a time interval between two of the plurality of data items having adjacent time information to each other exceeds a predetermined value, setting an arrangement position to which no data item is assigned between the arrangement positions, out of the plurality of arrangement positions, to which the two data items are assigned, wherein, when there are a plurality of data items whose time information indicates time which is in a period of time corresponding to one of the plurality of arrangement positions, said second display means displays icons representing the plurality of data items in a range between the corresponding arrangement position and a next arrangement position.

46. An information processing method comprising:

a first displaying step of displaying a locus having a plurality of arrangement positions where icons are displayed;

a setting step of setting a predetermined period of time to each of the plurality of arrangement positions;

an obtaining step of obtaining temporal information of the plurality of data items stored in a storage means;

a second displaying step of displaying icons representing the plurality of data items at the arrangement positions corresponding to time indicated by temporal information obtained in said obtaining step;

a changing step of changing periods of time assigned to the respective arrangement positions on the locus collectively to an earlier time or to a later time; and a display updating step of updating displayed contents of information representing data items displayed in said second displaying step on the basis of the periods of time changed in said changing step, wherein, when latest time of the time axis is later than latest time of time information of the plurality of data items stored in the storage means, time for displaying information indicating a data item having earliest time information in the time information of the plurality of data items is set to one of the plurality of arrangement positions which corresponds to the latest time of the time axis in said changing step.

47. An information processing method comprising:

a first displaying step of displaying a locus having a plurality of arrangement positions where icons are displayed;

a setting step of setting a predetermined period of time to each of the plurality of arrangement positions;

an obtaining step of obtaining temporal information of the plurality of data items stored in a storage means;

a second displaying step of displaying icons representing the plurality of data items at the arrangement positions corresponding to time indicated by temporal information obtained in said obtaining step;

a changing step of changing periods of time assigned to the respective arrangement positions on the locus collectively to an earlier time or to a later time; and a display updating step of updating displayed contents of information representing data items displayed in said second displaying step on the basis of the periods of time changed in said changing step, wherein when latest time of the time axis is earlier than earliest time of time information of the plurality of data items stored in the storage means, time for displaying information indicating a data item having latest time information in the time information of the plurality of data items is set to one of the plurality of arrangement positions which corresponds to the latest time of the time axis in said changing step.

48. An information processing method comprising:

a first displaying step of displaying a locus having a plurality of arrangement positions where icons are displayed;

an obtaining step of obtaining temporal information of a plurality of stored data items;

a second displaying step of assigning the plurality of data items to the plurality of arrangement positions, respectively, in temporal order on the basis of the time information obtained in said obtaining step and displaying icons corresponding to the respective data items at the respective arrangement positions; and a control step of, when a time interval between two of the plurality of data items having adjacent time information to each other exceeds a predetermined value, setting an arrangement position to which no data item is assigned between the arrangement positions, out of the plurality of arrangement positions, to which the two data items are assigned, wherein, when there are a plurality of data items whose time information indicates time which is in a period of time corresponding to one of the plurality of arrangement positions, icons representing the plurality of data items are displayed in a range between the corresponding arrangement position and a next arrangement position in said second displaying step.

49. A computer readable medium storing instructions to control a processor-controlled apparatus to perform an information processing method comprising:

a first displaying step of displaying a locus having a plurality of arrangement positions where icons are displayed;

a setting step of setting a predetermined period of time to each of the plurality of arrangement positions;

an obtaining step of obtaining temporal information of the plurality of data items stored in a storage means;

a second displaying step of displaying icons representing the plurality of data items at the arrangement positions corresponding to time indicated by temporal information obtained in said obtaining step;

a changing step of changing periods of time assigned to the respective arrangement positions on the locus collectively to an earlier time or to a later time; and a display updating step of updating displayed contents of information representing data items displayed in said second displaying step on the basis of the periods of time changed in said changing step, wherein, when latest time of the time axis is later than latest time of time information of the plurality of data items stored in the storage means, time for displaying information indicating a data item having earliest time information in the time information of the plurality of data items is set to one of the plurality of arrangement positions which corresponds to the latest time of the time axis in said changing step.

50. A computer readable medium storing instructions to control a processor-controlled apparatus to perform an information processing method comprising:

a first displaying step of displaying a locus having a plurality of arrangement positions where icons are displayed;

a setting step of setting a predetermined period of time to each of the plurality of arrangement positions;

an obtaining step of obtaining temporal information of the plurality of data items stored in a storage means;

a second displaying step of displaying icons representing the plurality of data items at the arrangement positions corresponding to time indicated by temporal information obtained in said obtaining step;

a changing step of changing periods of time assigned to the respective arrangement positions on the locus collectively to an earlier time or to a later time; and a display updating step of updating displayed contents of information representing data items displayed in said second displaying step on the basis of the periods of time changed in said changing step, wherein when latest time of the time axis is earlier than earliest time of time information of the plurality of data items stored in the storage means, time for displaying information indicating a data item having latest time information in the time information of the plurality of data items is set to one of the plurality of arrangement positions which corresponds to the latest time of the time axis in said changing step.

51. A computer readable medium storing instructions to control a processor-controlled apparatus to perform an information processing method comprising:

a first displaying step of displaying a locus having a plurality of arrangement positions where icons are displayed;

an obtaining step of obtaining temporal information of a plurality of stored data items;

a second displaying step of assigning the plurality of data items to the plurality of arrangement positions, respectively, in temporal order on the basis of the time information obtained in said obtaining step and displaying icons corresponding to the respective data items at the respective arrangement positions; and a control step of, when a time interval between two of the plurality of data items having adjacent time information to each other exceeds a predetermined value, setting an arrangement position to which no data item is assigned between the arrangement positions, out of the plurality of arrangement positions, to which the two data items are assigned, wherein, when there are a plurality of data items whose time information indicates time which is in a period of time corresponding to one of the plurality of arrangement positions, icons representing the plurality of data items are displayed in a range between the corresponding arrangement position and a next arrangement position in said second displaying step.

* * * * *

UNITED STATES PATENT AND TRADEMARK OFFICE
CERTIFICATE OF CORRECTION

PATENT NO.    :  5,977,974
DATED         :  November 2, 1999
INVENTOR(S)   :  KENJI HATORI ET AL.

It is certified that error appears in the above-identified patent and that said Letters Patent is hereby corrected as shown below:

SHEET 12:

Figure 12, "INITIARIZE" should read --INITIALIZE--.

SHEET 13:

Figure 13, "INITIARIZE" should read --INITIALIZE--.

SHEET 22:

Figure 22, "DESPLAYED" should read --DISPLAYED--.

COLUMN 1:

Line 41, "time," should read --time;--.

COLUMN 2:

Line 19, "a little" should read --a few--.

COLUMN 4:

Line 38, "without conscious" should read --without being conscious--;
    Line 40, "harddisk" should read --hard disk--;
    Line 46, "without conscious" should read --without being conscious--; and
    Line 53, "without conscious" should read --without being conscious--.

UNITED STATES PATENT AND TRADEMARK OFFICE
CERTIFICATE OF CORRECTION

PATENT NO. : 5,977,974
DATED : November 2, 1999
INVENTOR(S) : KENJI HATORI ET AL.

It is certified that error appears in the above-identified patent and that said Letters Patent is hereby corrected as shown below:

COLUMN 5:

Line 6, "performs" should read --perform--.

COLUMN 6:

Line 16, "list(data" should read --list (data--;
    Line 36, "same" should read --same holds--;
    Line 65, "what" should be deleted; and
    Line 66, "tions data" should read --tion what data--.

COLUMN 7:

Line 22, "A display" should read --Display--; and
    Line 30, "decreases" should read --decrease--.

COLUMN 9:

Line 27, "attributes" should read --attribute--; and
    Line 50, "can not" should read --cannot--.

COLUMN 11:

Line 58, "the toward" should read --toward the--.

COLUMN 12:

Line 45, "positions which makes it easy" should read --positions, it is easy--.

UNITED STATES PATENT AND TRADEMARK OFFICE
CERTIFICATE OF CORRECTION

PATENT NO. : 5,977,974

DATED : November 2, 1999

INVENTOR(S) : KENJI HATORI ET AL.

It is certified that error appears in the above-identified patent and that said Letters Patent is hereby corrected as shown below:

COLUMN 13:

Line 53, "then" should read --than--.

COLUMN 14:

Line 17, "intervals" should read --intervals are--; and
    Line 55, "o n" should read "on".

COLUMN 15:

Line 62, "base on" should read --based on--.

COLUMN 16:

Line 4, "unit" should read --units--; and
    Line 15, "data" should read --date--.

COLUMN 17:

Line 6, "S1705 upon" should read --S1705. Upon--;
    Line 19, "attributes" should read --attribute--;
    Line 21, "to in" should read --in--; and
    Line 48, "many number of" should read --many--.

COLUMN 18:

Line 62, "and time" should read --and a time--,
        "data time" should read --data times-- and
        "are" should read --is--; and
    Line 63, "maker" should read --marker--.

UNITED STATES PATENT AND TRADEMARK OFFICE
CERTIFICATE OF CORRECTION

PATENT NO. : 5,977,974

DATED : November 2, 1999

INVENTOR(S) : KENJI HATORI ET AL.

It is certified that error appears in the above-identified patent and that said Letters Patent is hereby corrected as shown below:

COLUMN 19:

Line 9, "a re" should read --are--;
    Line 15, "then" should read --than--;
    Line 38, "arbitrary" should read --arbitrarily--;
    Line 48, "1003b" should read --1004b--; and
    Line 50, "1003b" should read --1004b--.

COLUMN 20:

Line 6, "1049a" should read --1040a--;
    Line 11, "zooming in" should read --zooming-in--;
    Line 14, "1049a" should read --1040a--;
    Line 27, "1049a" should read --1040a--; and
    Line 48, "to displayed" should read --to be displayed--.

COLUMN 21:

Line 5, "October," should read --October--;
    Line 18, "equal" should read --equal to--;
    Line 22, "cell" should read --cells--;
    Line 59, "that" should be deleted; and
    Line 66, "1071crepresents" should read --1071c represents--.

COLUMN 22:

Line 14, "includes" should read --include--;
    Line 19, "included" should read --is included--;
    Line 26, "data time when the data becomes belong-" should read --time when the data is assigned--;

UNITED STATES PATENT AND TRADEMARK OFFICE
CERTIFICATE OF CORRECTION

PATENT NO. : 5,977,974

DATED : November 2, 1999

INVENTOR(S) : KENJI HATORI ET AL.

It is certified that error appears in the above-identified patent and that said Letters Patent is hereby corrected as shown below:

Line 27, "ing" should be deleted;
    Line 45, "exist," should read --exist;--; and
    Line 62, "list" should read --list which--.

COLUMN 23:

Line 66, "reached" should read --reaches--.

COLUMN 24:

Line 25, "there is" should read --there are--;
    Line 28, "determined" should read --determine--;
    Line 35, "equal" should read --equal to--;
    Line 53, "interval." should read --intervals.--; and
    Line 58, "flowchart" should read --flowcharts--.

COLUMN 25:

Line 59, "triggers to proceeds" should read --would cause the flow to proceed--.

COLUMN 27:

Line 28, "at a" should read --at--; and
    Line 55, "are" should read --being--.

COLUMN 28:

Line 19, "th e" should read --the--.

UNITED STATES PATENT AND TRADEMARK OFFICE
CERTIFICATE OF CORRECTION

PATENT NO. : 5,977,974

DATED : November 2, 1999

INVENTOR(S) : KENJI HATORI ET AL.

It is certified that error appears in the above-identified patent and that said Letters Patent is hereby corrected as shown below:

<u>COLUMN 33</u>:

Line 2, "charged" should read --changed--.

<u>COLUMN 34</u>:

Line 15, "steps" should read --step,--.

Signed and Sealed this

Seventh Day of November, 2000

Attest:

Q. TODD DICKINSON

*Attesting Officer*     *Director of Patents and Trademarks*